United States Patent
Parsons et al.

(10) Patent No.: US 7,930,383 B2
(45) Date of Patent: Apr. 19, 2011

(54) SYSTEMS AND METHODS FOR DOMAIN NAME REGISTRATION BY PROXY

(75) Inventors: Robert R. Parsons, Scottsdale, AZ (US); Barbara J. Rechterman, Cave Creek, AZ (US); Joshua T. Coffman, Mesa, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 0 days.

(21) Appl. No.: 12/576,131

(22) Filed: Oct. 8, 2009

(65) Prior Publication Data
US 2010/0023592 A1 Jan. 28, 2010

Related U.S. Application Data

(63) Continuation of application No. 10/526,107, filed as application No. PCT/US02/27956 on Aug. 30, 2002, now Pat. No. 7,627,633.

(51) Int. Cl.
*G06F 15/173* (2006.01)
(52) U.S. Cl. .................................................. 709/223
(58) Field of Classification Search ................... 709/223
See application file for complete search history.

(56) References Cited

U.S. PATENT DOCUMENTS

| | | | |
|---|---|---|---|
| 6,044,205 A | 3/2000 | Reed et al. | |
| 6,230,188 B1 | 5/2001 | Marcus | |
| 6,286,045 B1 | 9/2001 | Griffiths et al. | |
| 6,308,203 B1 | 10/2001 | Itabashi et al. | |
| 6,311,207 B1 | 10/2001 | Mighdoll et al. | |
| 6,314,459 B1 | 11/2001 | Freeman | |
| 6,321,267 B1 | 11/2001 | Donaldson | |
| 6,330,605 B1 | 12/2001 | Christensen et al. | |
| 6,345,294 B1 | 2/2002 | O'Toole et al. | |
| 6,434,600 B2 | 8/2002 | Waite et al. | |
| 6,446,133 B1 | 9/2002 | Tan et al. | |
| 6,477,577 B1 | 11/2002 | Asano | |
| 6,480,508 B1 * | 11/2002 | Mwikalo et al. | 370/475 |
| 6,519,589 B2 * | 2/2003 | Mann et al. | 1/1 |

(Continued)

FOREIGN PATENT DOCUMENTS
GB 2347053 8/2000
(Continued)

OTHER PUBLICATIONS

Jul. 13, 2006 Notice of Allowance for related U.S. Appl. No. 10/624,883 now issued as patent No. 7,130,878.

(Continued)

*Primary Examiner* — Frantz B Jean
(74) *Attorney, Agent, or Firm* — Karl A. Fazio

(57) ABSTRACT

A system and method of proxy domain name registration permits a would-be domain name registrant anonymity. A registrar affords customers the opportunity to use the proxy registration. If the customer seeking registration of a domain name requests, the registrar obtains contact information needed for registration from a proxy entity established for this purpose. The registrar completes the registration of the domain name with the appropriate registry (i.e. ".com, .net" etc.). The contact information published in WHOIS is that of proxy entity. Contractually the customer is afforded control over the domain name. Emails intended for the customer are received by the proxy entity who may filter them if the customer requests. Emails sent by the customer are sent to the proxy entity who in turn sends them to the indicated addressee.

47 Claims, 21 Drawing Sheets

U.S. PATENT DOCUMENTS

| | | | |
|---|---|---|---|
| 6,643,687 B1 | 11/2003 | Dickie et al. | |
| 6,675,208 B1 | 1/2004 | Rai et al. | |
| 6,687,746 B1 | 2/2004 | Shuster et al. | |
| 6,745,248 B1 * | 6/2004 | Gardos et al. | 709/245 |
| 6,868,498 B1 | 3/2005 | Katsikas | |
| 6,880,007 B1 * | 4/2005 | Gardos et al. | 709/225 |
| 7,006,993 B1 | 2/2006 | Cheong et al. | |
| 7,007,093 B2 | 2/2006 | Spicer et al. | |
| 7,130,878 B2 | 10/2006 | Parsons et al. | |
| 2002/0091827 A1 | 7/2002 | King et al. | |
| 2002/0178381 A1 | 11/2002 | Lee et al. | |
| 2003/0191969 A1 | 10/2003 | Katsikas | |
| 2005/0188045 A1 | 8/2005 | Katsikas | |
| 2005/0289084 A1 | 12/2005 | Thayer et al. | |

FOREIGN PATENT DOCUMENTS

| | | |
|---|---|---|
| JP | 10275119 | 10/1998 |
| JP | 2001167017 | 6/2001 |
| JP | 2002063116 | 2/2002 |
| JP | 2002091874 | 3/2002 |
| JP | 2002297938 | 10/2002 |
| WO | 9906929 | 2/1999 |

OTHER PUBLICATIONS

Nov. 17, 2003 Preliminary Amendment in related U.S. Appl. No. 10/624,883 now issued as patent No. 7,130,878.

Apr. 8, 2005 Restriction Requirement in related U.S. Appl. No. 10/624,883 now issued as patent No. 7,130,878.

Apr. 18, 2005 Response to Apr. 8, 2005 Restriction Requirement in related U.S. Appl. No. 10/624,883 now issued as patent No. 7,130,878.

Jul. 25, 2005 Office Action in related U.S. Appl. No. 10/624,883 now issued as patent No. 7,130,878.

Aug. 29, 2005 Response to Jul. 25, 2005 Office Action in related U.S. Appl. No. 10/624,883 now issued as patent No. 7,130,878.

Dec. 16, 2005 Office Action in related U.S. Appl. No. 10/624,883 now issued as patent No. 7,130,878.

Feb. 22, 2006 Reply to Dec. 16, 2005 Office Action in related U.S. Appl. No. 10/624,883 now issued as patent No. 7,130,878.

Apr. 1, 2009 Notice of Allowance for related U.S. Appl. No. 10/526,107 now issued as patent No. 7,627,633.

Feb. 28, 2005 Preliminary Amendment in related U.S. Appl. No. 10/526,107 now issued as patent No. 7,627,633.

Apr. 26, 2005 Preliminary Amendment in related U.S. Appl. No. 10/526,107 now issued as patent No. 7,627,633.

Feb. 8, 2007 Office Action in related U.S. Appl. No. 10/526,107 now issued as patent No. 7,627,633.

May 4, 2007 Response to Feb. 8, 2007 Office Action in U.S. Appl. No. 10/526,107 now issued as patent No. 7,627,633.

Mar. 28, 2008 Office Action in related U.S. Appl. No. 10/526,107 now issued as patent No. 7,627,633.

Dec. 5, 2008 Appeal Brief in related U.S. Appl. No. 10/526,107 now issued as patent No. 7,627,633.

Sep. 29, 2006 Preliminary Amendment in related U.S. Appl. No. 11/498,500.

Nov. 1, 2007 Office Action in related U.S. Appl. No. 11/498,500.

Aug. 22, 2008 Response to May 2, 2008 Office Action in related U.S. Appl. No. 11/498,500.

Nov. 28, 2008 Office Action in related U.S. Appl. No. 11/498,500.

May 2, 2008 Office Action in related U.S. Appl. No. 11/498,500.

Oct. 28, 2009 Appeal Brief in in related U.S. Appl. No. 11/498,500.

Dec. 15, 2009 Appeal Brief in in related U.S. Appl. No. 11/498,500.

Jul. 20, 2010 final office action in related U.S. Appl. No. 11/498,500.

Sep. 16, 2010 response to Jul. 20, 2010 final office action in related U.S. Appl. No. 11/498,500.

Sep. 1, 2010 Notice of Allowance in related U.S. Appl. No. 12/617,911.

WIPO Administrative Panel Decision, Marian Keyes & Old Barn Studios Ltd., case No. D2002-0687, Sep. 23.

"Anonyme Domains moglich," German language document, Nov. 28, 2001 (1 p.).

Securities and Exchange Commision Form S-1 of Register.com, Inc., Mar. 2, 2000, selected pages (references to "account masking").

Website page of register.com (1 p.).

Register.com, Inc. 2001 Annual Report including Securities and Exchange Commission For 1O-K, selected pages (references to "account masking") (5 pp.).

Zenel, B., "A General Purpose Proxy Filtering Mechanism Applied to the Mobile Enviroment," Wireless Network, 1999, vol. 5, pp. 391-409.

Hall, R. J., "How to Avoid Unwanted Email," ACM, Mar. 1998, vol. 41, No. 3, pp. 88-95.

Deloria, W. C., Bettis, L. J., "DMS Service Management," MILCOM 1994, Conf. Record, IEEE, vol. 3, pp. 967-971.

Smith, R.N., "Operating Firewalls outside the LAN Perimeter," 1999 IEEE International, pp. 493-498.

Mar. 22, 2010 non-final office action in related U.S. Appl. No. 11/498,500.

Apr. 21, 2010 response to Mar. 22, 2010 non-final office action in related U.S. Appl. No. 11/498,500.

Jun. 28, 2010 non-final office action in related U.S. Appl. No. 12/617,911.

Jul. 13, 2010 response to Jun. 28, 2010 non-final office action in related U.S. Appl. No. 12/617,911.

* cited by examiner

▶ WHOIS Search Results

```
Registrant:
Gallagher & Kennedy (GKNET-DOM)
   2600 N. Central Ave
   Phoenix, AZ 85004
   US Domain Name: GKNET.COM Administrative Contact:
   Ulan, Gail   (GU212)                       gmu@GKNET.COM
   Gallagher & Kennedy
   2600 N. Central Ave
   Phoenix, AZ 85004
   602-530-8000 (FAX) 602-530-8000
Technical Contact:
   Center, Network Control   (NCC7)           ncc@WESTPUB.COM
   West Publishing Corporation
   620 Opperman Drive
   St. Paul, MN 55164-0779
   612/687-8188 (FAX) 612/687-5710

Record expires on 30-Mar-2011.
Record created on 29-Mar-1996.
Database last updated on 30-Aug-2002 14:54:01 EDT.

Domain servers in listed order:

NS1.WESTGROUP.NET                  163.231.229.1
NS2.WESTGROUP.NET                  163.231.245.1
```

SYSTEMS AND METHODS FOR DOMAIN NAME REGISTRATION BY PROXY

CROSS REFERENCE TO RELATED PATENT APPLICATIONS

This patent application is a continuation of U.S. patent application Ser. No. 10/526,107 to Robert R. Parsons, et al., with filing date Feb. 28, 2005, and entitled: "Proxy Email Method and System," which is a U.S. National Stage continuation of PCT Application No. PCT/US02/27956 "Proxy Email Method and System," filed Aug. 30, 2002 in the U.S. Receiving Office (issued as U.S. Pat. No. 7,627,633 on Oct. 31, 2006), priority from which is hereby claimed.

This patent application is also related to the following previously-filed patent applications:

U.S. patent application Ser. No. 10/624,883 in the name of Robert R. Parsons, et al., with filing date Jul. 21, 2003 and entitled "Systems and Methods for Domain Name Registration by Proxy" (issued as U.S. Pat. No. 7,130,878 on Oct. 31, 2006);

U.S. patent application Ser. No. 11/498,500 to Robert R. Parsons, et al., with filing date Aug. 2, 2006, and entitled: "Systems and Methods for Domain Name Registration by Proxy;" and U.S. patent application Ser. No. 12/463,927 to Robert R. Parsons, et al., with filing date Aug. 10, 2009, and entitled: "Proxy Email Method and System."

FIELD OF THE INVENTION

The present invention relates to a method and system for proxy domain name registration and, more particularly, to a method and system for privately registering domain names over the Internet.

BACKGROUND OF THE INVENTION

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for the Web page in a request (e.g., a HyperText Transfer Protocol ("HTTP") request). These follow the familiar format http://www.xxx.com uniquely identifying the particular resource. The request is forwarded to the Web server that supports that Web page to the client computer system. When the client computer system receives that Web page, it typically displays the Web page using a browser. A browser is a special-purpose application program that effects the requesting of Web pages and the displaying of Web pages.

Currently, Web pages are typically defined using Hyper-Text Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs or other Web pages available on that server computer system or other server computer systems.

Generally a Web page's address or URL is made up of the name of the server along with the path to the file or the server. Rather than using a Web hosting service's server name as their URL, most companies and many individuals and other entities prefer a "domain name" of their own choosing. In other words, the Ford Motor Company probably would prefer http://www.ford.com as its URL rather than, say, http://servername.com/~ford, where "servername" is the name of a Web hosting service whose server The Ford Motor Company uses. For this purpose then a "domain name," e.g. "ford" can be registered, if available, and the hosting service will use that URL for its customer's Web address.

The process of registering one's own domain name proceeds as follows: Referring to FIG. 1 shown there are the various entities that participate in the registration of a domain name. The communications like those shown here and in other Figures of the drawings are typically communications via the Internet, but could be direct LAN, or WAN connections, telephone land line or cell phone links, communications by RF or optic fibers among others. An individual, company, small business or other entity 20 (hereinafter "customer") desires to obtain his/her own domain name using one or more of the Internet Corporation for Assigned Names & Numbers ("ICANN") approved top level domain ("TLD") name extensions (e.g., .com, .net, .org, .us, .biz, etc.). All domains are organized through a shared, central domain name registration system. There is one domain name registration system, or registry 22 for each of the ICANN-approved TLDs. Each registry 22 is operated and maintained by an ICANN-approved company 20. The entities 20, 24 and 22 in FIG. 1 include, of course, computer installations equipped typically for Internet communication. FIG. 1 assumes that the customer 20 has a server or servers. It may, however, contract with another, a host who provides servers as is conventional. This does not change the relationship of the entities involved here and so is not separately shown.

The process for registering a domain name with a particular registry requires a customer to use an ICANN accredited registrar 24. For example, John Doe wishes to register the following domain name: "johndoe.com". Initially, John Doe must verify whether the desired domain name is or is not available, by contacting the ICANN-accredited registrar 24. Utilizing a database search engine run by the registrar 24, at 30 in FIG. 2, JohnDoe can ascertain whether "johndoe.com" has already been registered by another customer by requesting the domain name from the registrar at 32. The registrar determines if the domain name is available at 34. If the desired domain name has not been registered, the registrar so advises the customer, at 35. The customer can proceed with the registration, utilizing the services of any ICANN approved registrar.

Regardless of the registrar used to process the registration, the customer must (together with payment of the registrar's applicable fees), provide certain personal information at 36 in order to complete the registration. That information includes the customer's address and personal contact information including email addresses, phone numbers and mailing addresses of administrative and technical contacts. The registrar stores the customer contact information and domain name in a temporary, working contact table at 38. Thereafter, with the registration request, the registrar transmits, at 40, certain information to the registry regarding both the registrar and the customer, who will, upon completion of the registration process, be identified as the "registrant" of the domain that is now officially registered with the registry. The registry adds, at 42, the domain name, the registrant's name and identification of the registrar to the part 23 of the WHOIS database 27 kept by the registry. The registry confirms registration at 46. The registration process is concluded by the registrar confirming the registration to the customer at 52 and 54.

Upon completion of the registration process at 41, certain identifying information is made publicly available in a database managed by each registrar. This is the registrar's portion 25 of the WHOIS database 27 shown on FIG. 1. For each registered domain name, the registrar's WHOIS database identifies the name of registrar, the registrar's "WHOIS" homepage link, the date the domain name was registered and the domain name's expiration date. The WHOIS database also makes public the registrant's personally identifiable information, specifically the registrant's name and postal address, phone number and email address, the name of administrative and technical contacts, and their respective postal address, voice and fax telephone numbers and email addresses and the name of the servers upon which the registered domain name is located.

The registrar's WHOIS database is accessible by anyone who has Internet access, anywhere and anytime. Although the use to which WHOIS data can be put is limited by ICANN, the registrant's personally identifiable information is required to be readily available to the public, including those who would seek to engage in data mining, SPAMMING, or other potentially undesirable activities. A typical WHOIS record from a registrar is shown in FIG. 10.

For certain domain name registrants, it would be desirable if the personal contact information required to be displayed on the WHOIS database were not available. For example, a celebrity who wishes to participate in activities on the WWW might not want her identity and other information known so as to avoid harassment, stalking, hacking, data mining or simply "prying eyes." It would be desirable if such persons could anonymously participate in Web-related activities, even having a home page, without their true identity being known, but without violating the rules set down by ICANN. Typically, domain name owners receive email at an email address that contains their domain name ordinarily. For example, xxx@yyy.com is an email address where yyy is the registrant's domain name. Because of the availability of the registrant's email address on the WHOIS record available from the registrar, a member of the public can address email to the registrant. In addition to shielding its domain name registrant from unwanted contact including harassment, stalking, prying, and the like, it could be desirable to keep the domain name registrant's email address confidential. It could further be desirable in many instances for that registrant to have access to the email intended for it without having to publish its email address for all to see. In addition it could be desirable to the anonymous Web participant to respond anonymously to email or to originate email anonymously.

Filtering of email messages to preclude junk email, SPAM, unauthorized bulk email, unauthorized commercial email, pornography, viruses, worms, Trojan horses, and other harmful submissions would often be desirable, as well.

SUMMARY OF THE INVENTION

In accordance with this invention, a system and method for the registration of domain names employs a proxy entity ("proxy") to maintain the confidentiality of a domain name owner. A would-be domain name registrant can choose to have its desired domain name registered in the name of the proxy. The publicly available registrant information lists just the proxy's personal contact information.

Email intended for the customer is diverted to the proxy registrant whose email address appears on the publicly available registration information WHOIS. The proxy can, if the customer desires, filter out unwanted email, block all email, or forward all email to the customer.

Contractually, the customer enjoys the full rights of ownership of the domain name. The customer can: cancel the proxy's services anytime in which case ownership of the domain name will revert back to the private registrant; sell, transfer or assign the domain name to anyone else, in which event the purchaser, transferee or assignee will become the official "registrant" of record with the applicable registry; control and/or manage each domain name, including designating the IP address to which each domain name points; cancel each domain name's registration; renew each domain name upon its expiration; and have a right of first refusal should proxy's ownership of the domain name become subject to creditor's claims. The system permits the customer to cancel the proxy registration at any time by two clicks on a Web page. Upon that command, the registrar who has registered the domain name in the name of the proxy transfers the domain name to the customer, using the customer's actual contact information.

Typically the communications among the involved participants are among computer installations via the Internet. But, without departing from the invention, they could be by those other communication modes mentioned above.

In accordance with one embodiment of the invention, a would-be domain name customer contacts the registrar who then checks with the registry to see if the domain name is available. If it is, the registrar so advises the customer, requests the customer's personal contact information and asks if the customer chooses to register by proxy. Of course, this is done by interactive screens that are a part of the registrar's Web site.

If the customer declines to register by proxy, then the registrar completes registration in the ordinary fashion. In that case, it will be the customer's personal contact information and email address that appears in the WHOIS records as usual.

On the other hand, if the customer decides to register by proxy, the registrar temporarily records the customer's personal contact information in a temporary, working table. The registrar contacts the proxy entity and obtains from the proxy entity the personal contact information of the proxy entity. The registrar then registers the chosen domain name in the name of the proxy and gives the proxy's personal contact information. The proxy, then, is the actual registrant and owns the domain name. As stated, however, all of the rights of ownership are contractually made available to the customer. The registrar gives to the proxy the customer's personal contact information, and the proxy stores that in a permanent record along with the domain name. The registrar stores the proxy's name, the domain name, and the proxy's personal contact information and email address in its permanent database record, which is the registrar's portion of the WHOIS database.

Once the registrar completes the registration, the proxy will notify the individual, via email, that an account with the proxy has been opened and request that the individual "click"

on a link to activate the account. The individual will also be given a password so that the individual can access his/her proxy account.

If the customer chooses, email intended for the customer will go to the proxy if the sender has determined the email address from the WHOIS record or from another location such as a Web site or print media listing the proxy email address. During the registration process, the registrar has the customer indicate whether it wishes to receive all email addressed to the proxy email address, no email addressed to that address, or email from which objectionable mail has been filtered.

If filtration is chosen by the customer during registration, then the proxy uses familiar filtration principles based on key words in the message, known SPAM originators in the "from" field, and the number of addressees in either the "from" or the "cc:" field to determine if there is objectionable content, if the email has come from a known source of SPAM, or if the email is being emailed in bulk.

Of course the described operations are effected through programming at the registrar and the proxy entity. When the proxy's email server receives email it determines whether it is real email for the proxy or email intended for a customer. Email addressed to the proxy entity that is to be forwarded has its message stripped and copied into an email from the proxy along with the sender's email identity and the alert that "this message was sent to you at the proxy email address."

The above and further objects and advantages will be better understood with reference to the following detailed description of at least one preferred embodiment taken in consideration with the accompanying drawings

DESCRIPTION OF THE DRAWINGS

FIG. 10 is an exemplary WHOIS record available from a registrar;

DETAILED DESCRIPTION

Figure 3:
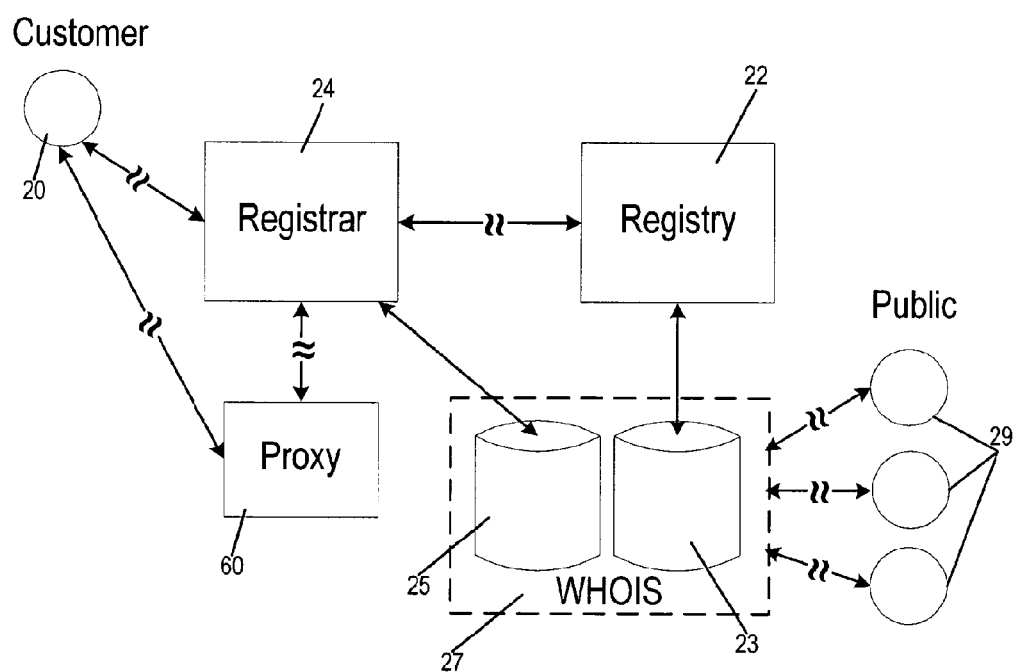
FIG. 3 is a block diagram like FIG. 1 showing the relationship of participants in a domain name registration process according to this invention.

Turning to FIG. 3, the participants in a domain name registration by proxy include the customer 20, the registrar 24, the registry 22, and the proxy entity 60. Each of the registrar 24 and registry 22 has a permanent record portion 23, 25 of the WHOIS database 27. The registry's portion 23 lists domain name, registrant, and registrar information. The registrar's portion 25 lists the information shown in FIG. 10, a representative WHOIS record from a registrar. The customer, registrar and proxy computer installations are typically in communication via the Internet. The registrar and registry are in communication, again typically by Internet. The public indicated at 29 has available to it via the Internet the WHOIS records in the databases maintained by the registry and the registrar.

Figure 1:
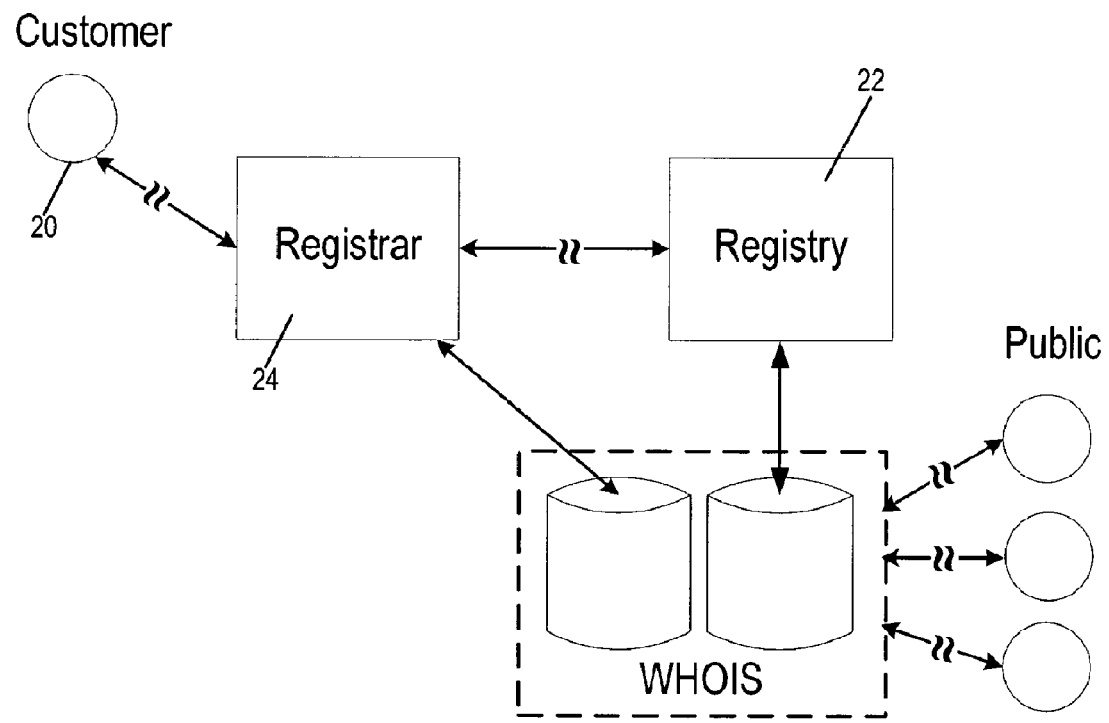
FIG. 1 is a block diagram illustrating the relationship between the participants in a prior art domain name registration process.
Figure 2A:
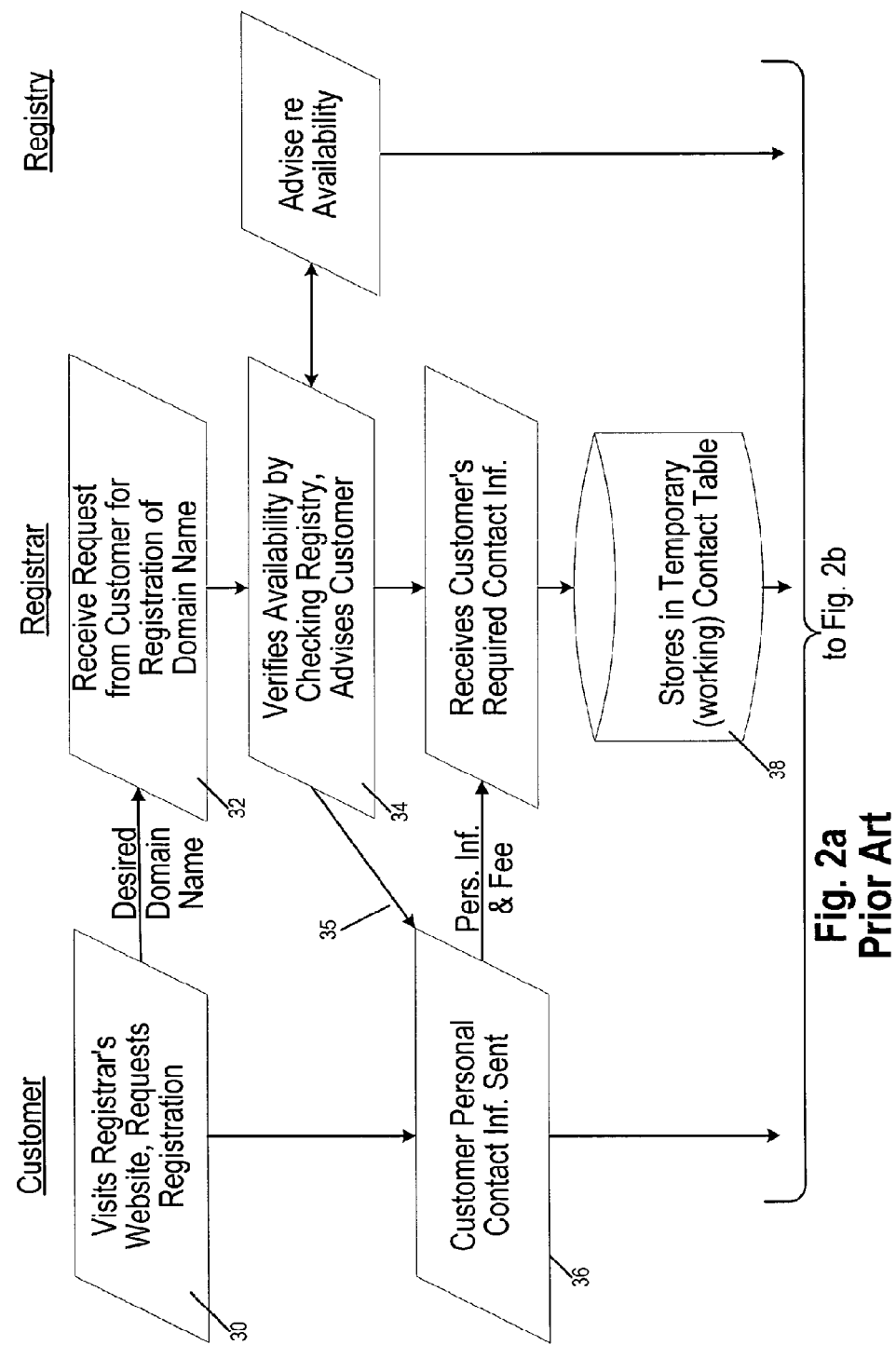
FIG. 2 is a functional block diagram in flowchart form illustrating the method of domain name registration typically employed in a prior art registration process.
Figure 2B:
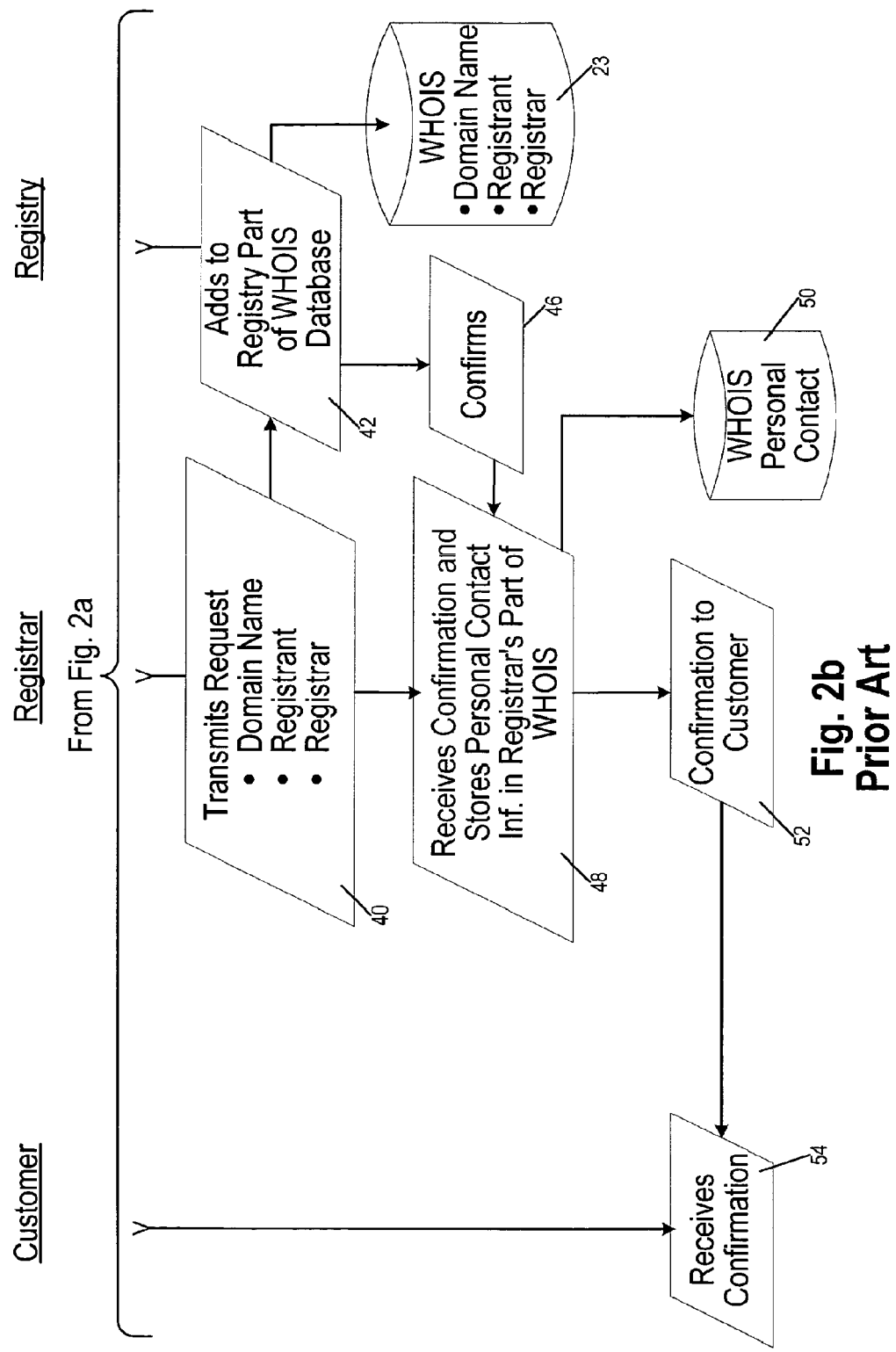
Figure 4A:
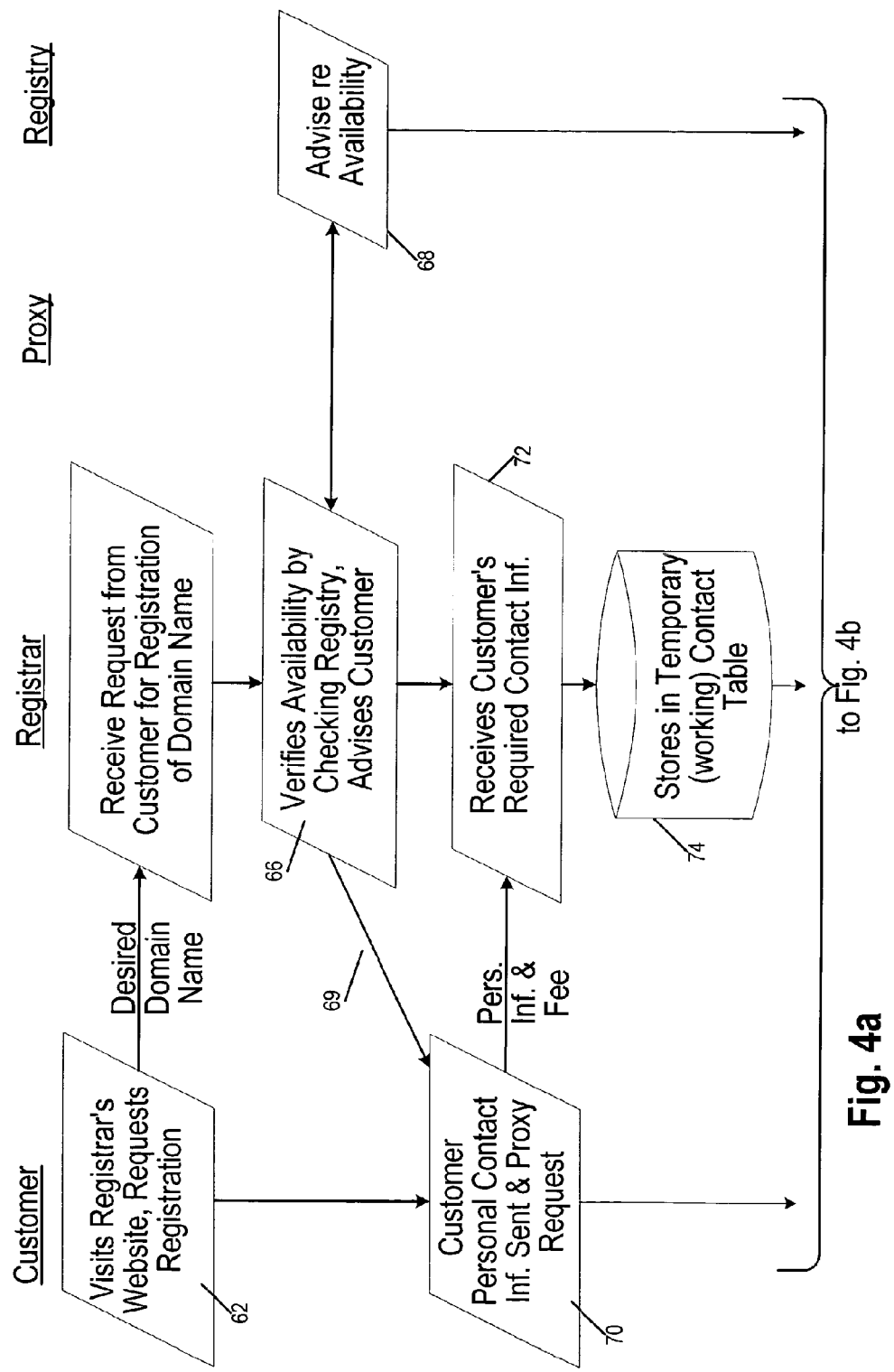
FIG. 4 is a functional block diagram like FIG. 2 in flowchart form showing the process of proxy domain name registration in accordance with this invention.
Figure 4B:
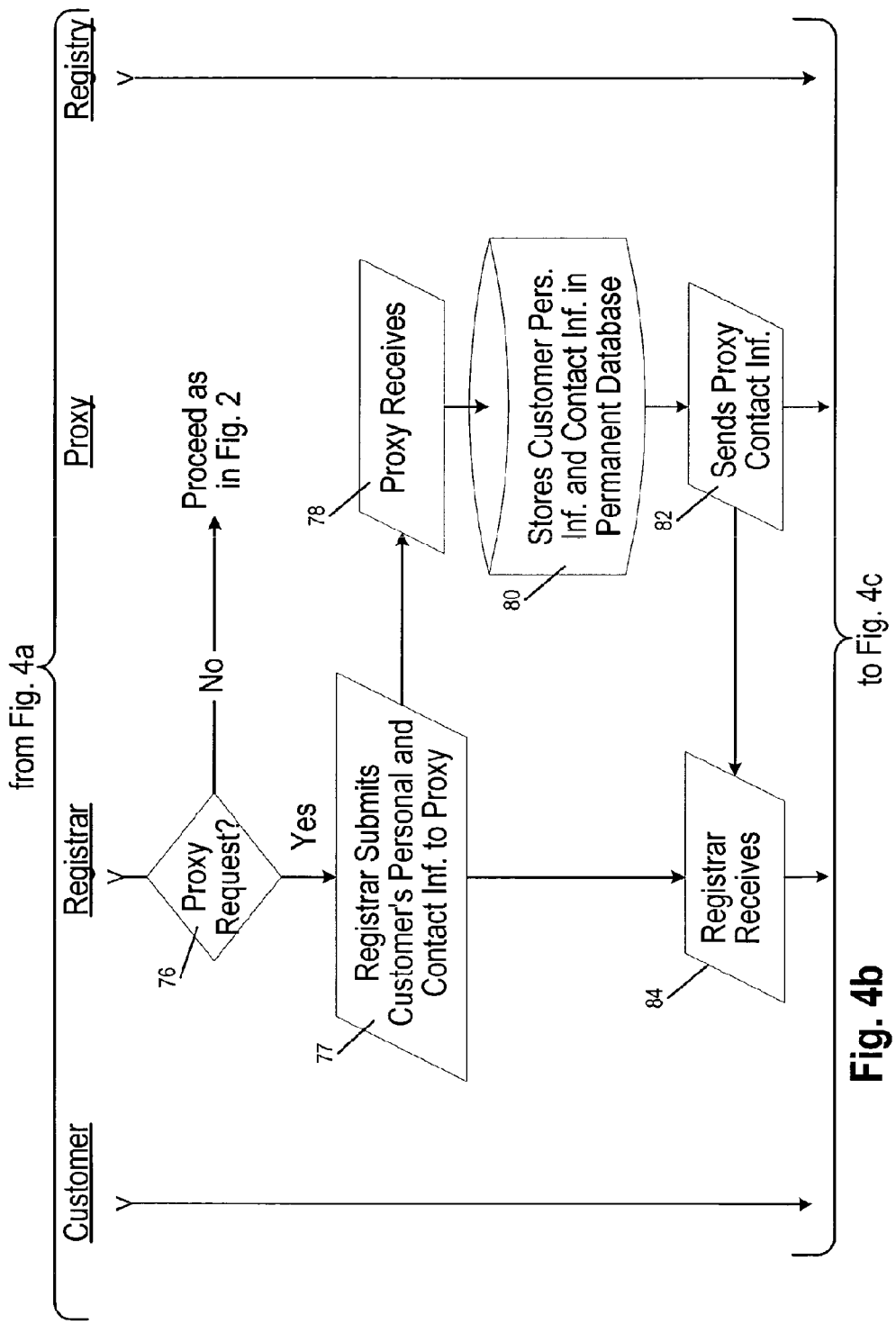
Figure 4C:
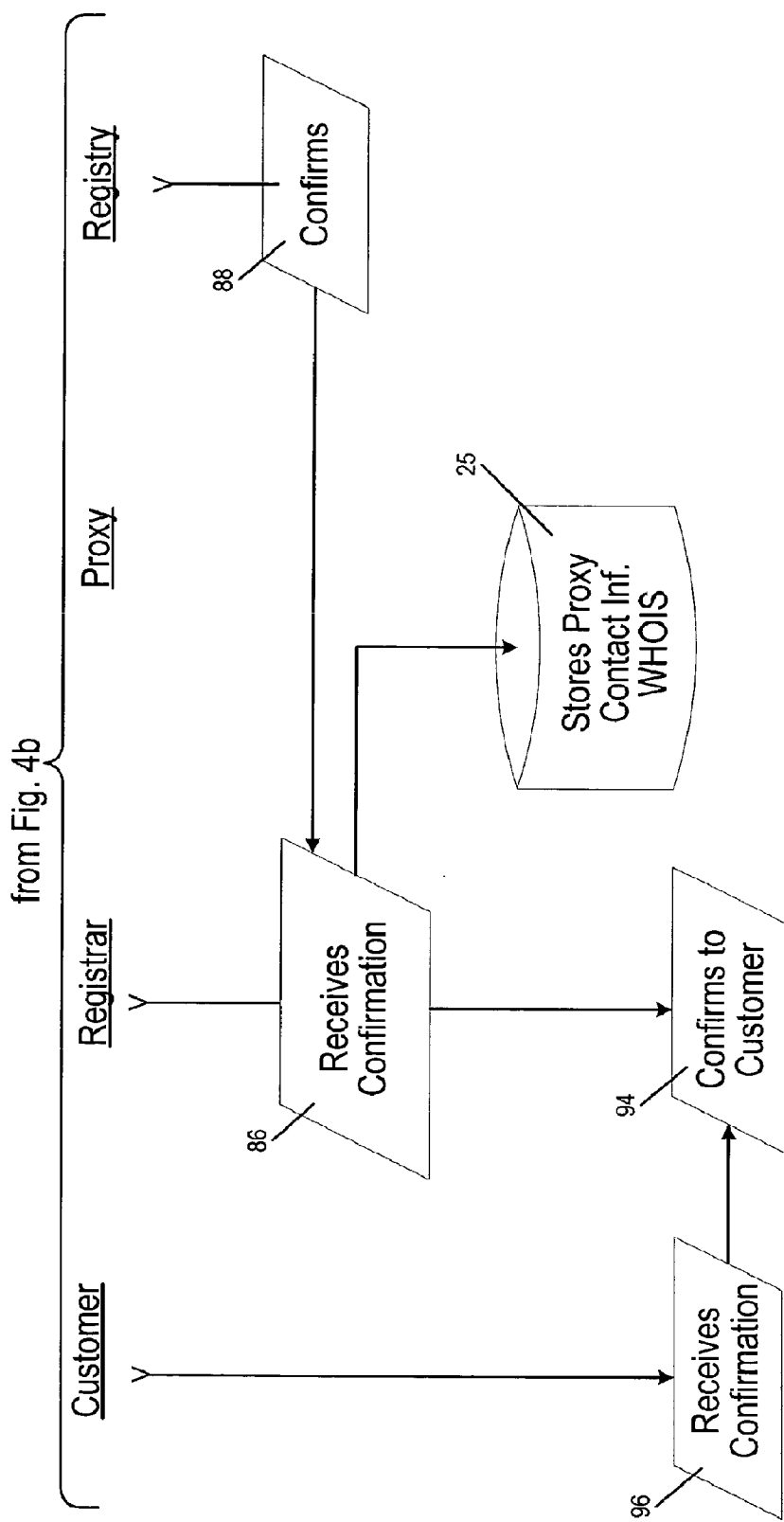
Figure 11:
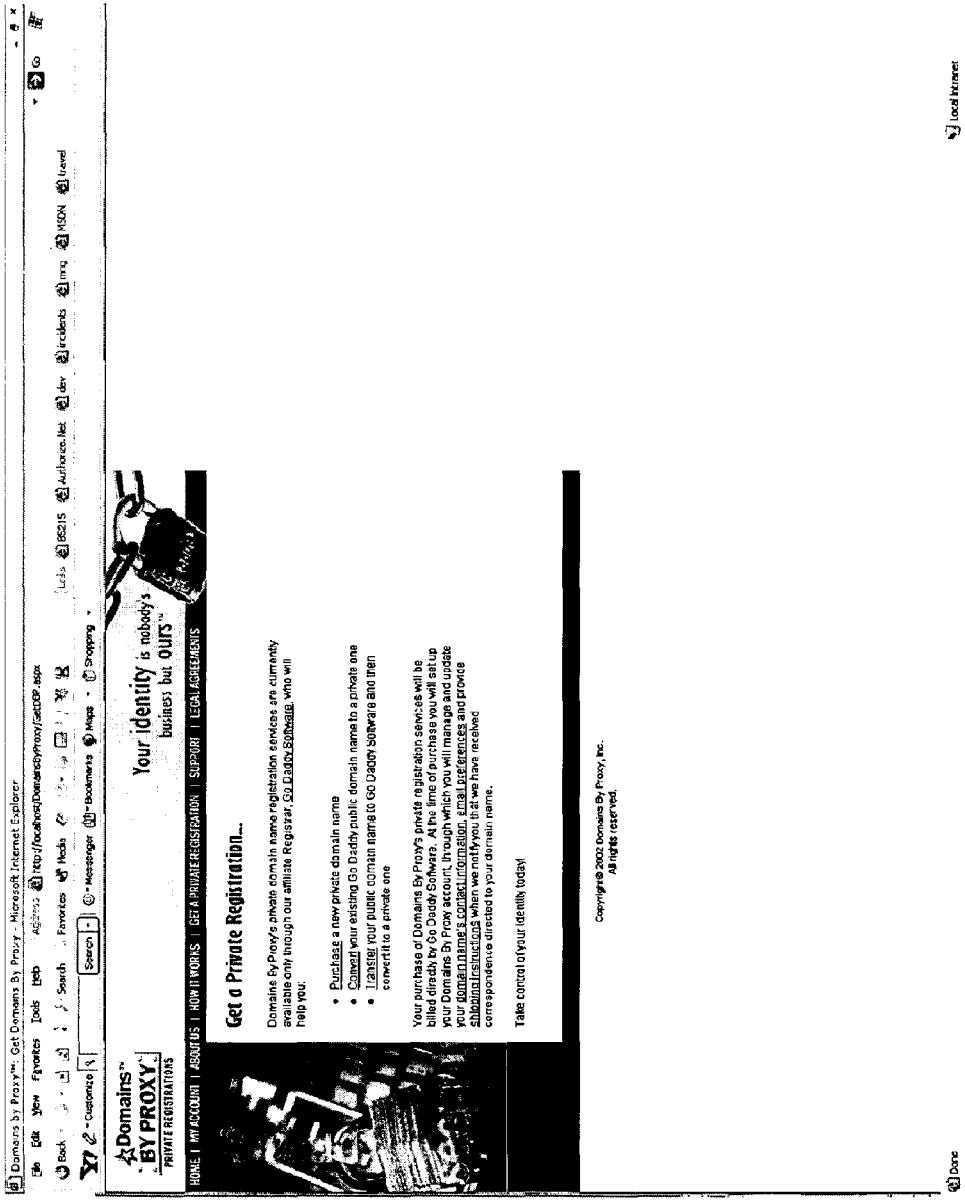
FIG. 11 is a screen shot illustrating an initial screen by which a customer initiates registration by proxy.

As illustrated in FIG. 4, proxy registration proceeds as follows. Just as in the prior art FIG. 2*a* procedure, the customer visits registrar's Web site and requests registration at 62. The customer may be referred from a proxy's screen like that illustrated in FIG. 11. The registrar computer installation receives the request including the desired domain name at 64. It verifies availability at 66 by checking with the registry at 68 and advises the customer at 69. As indicated at 70, customer personal contact information, and in this case, a proxy request is supplied to the registrar. The registrar receives it at 72. The registrar stores the customer personal contact information in computer memory in a temporary, working contact table at 74. At 76 the registrar's computer program enters a decision block. If no proxy request has been made the program continues as in FIG. 2. If, as here, proxy registration has been requested, then the registrar's program departs from the prior art FIG. 2 procedure and submits, at 77, the customer's personal contact information to the proxy at 78. At 80 the proxy stores the customer's personal information in its permanent database. The proxy then sends its personal contact information to the registrar at 82. Upon receipt of the proxy contact information at 84, the registrar sends a request for registration of the domain name and the proxy personal contact information to the registry at 86. At 88, the registry receives the request and records the domain name along with the proxy registrant identification and the registrar information in its WHOIS portion 23. Then at 90 the registry confirms the registration.

Upon receiving the confirmation from the registry at 92, the registrar stores the proxy contact information in its permanent table that forms its portion of the WHOIS database 25, at 94 the registrar confirms the registration to the customer, who receives that confirmation at 96.

Figure 5A:
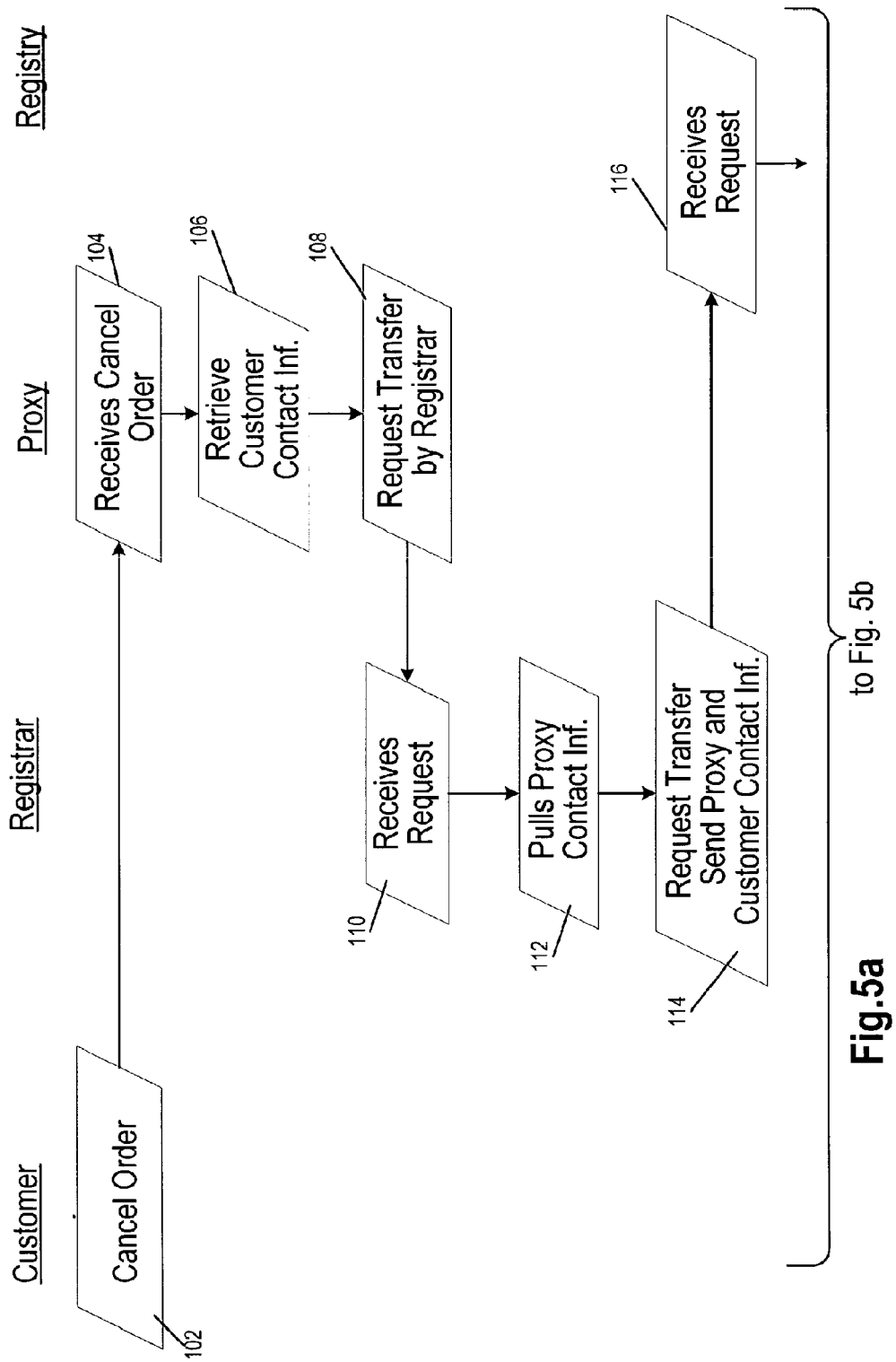
FIG. 5 is a functional block diagram in flowchart form showing the steps in cancellation of proxy registration in accordance with this invention.
Figure 5B:
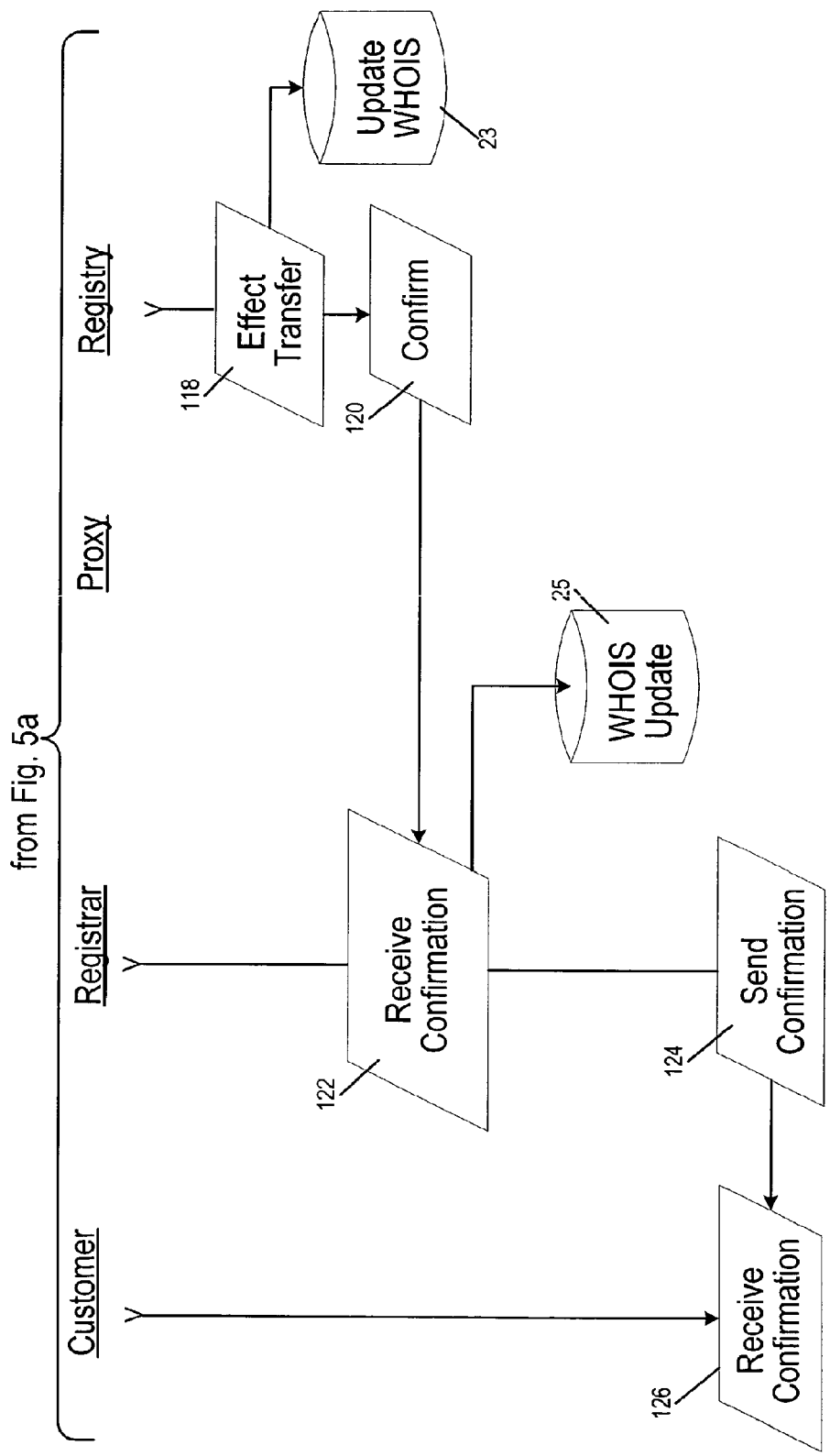
Figure 6:
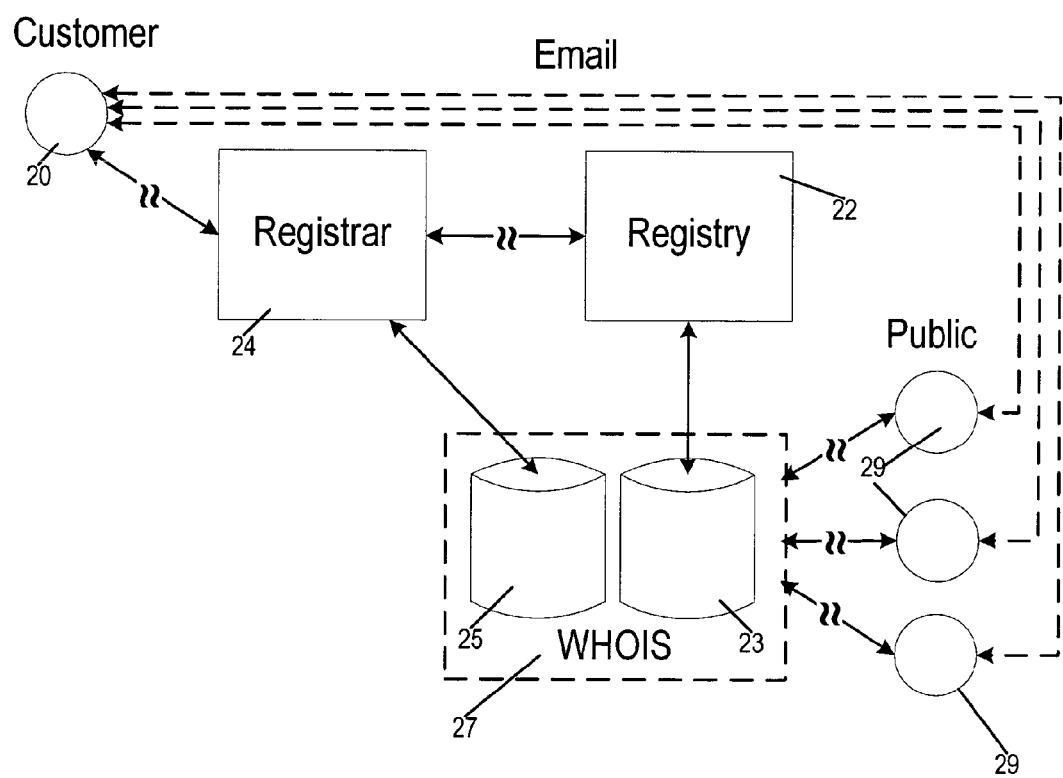
FIG. 6 is a block diagram showing the relationship of participants in a typical email process.
Figure 14:
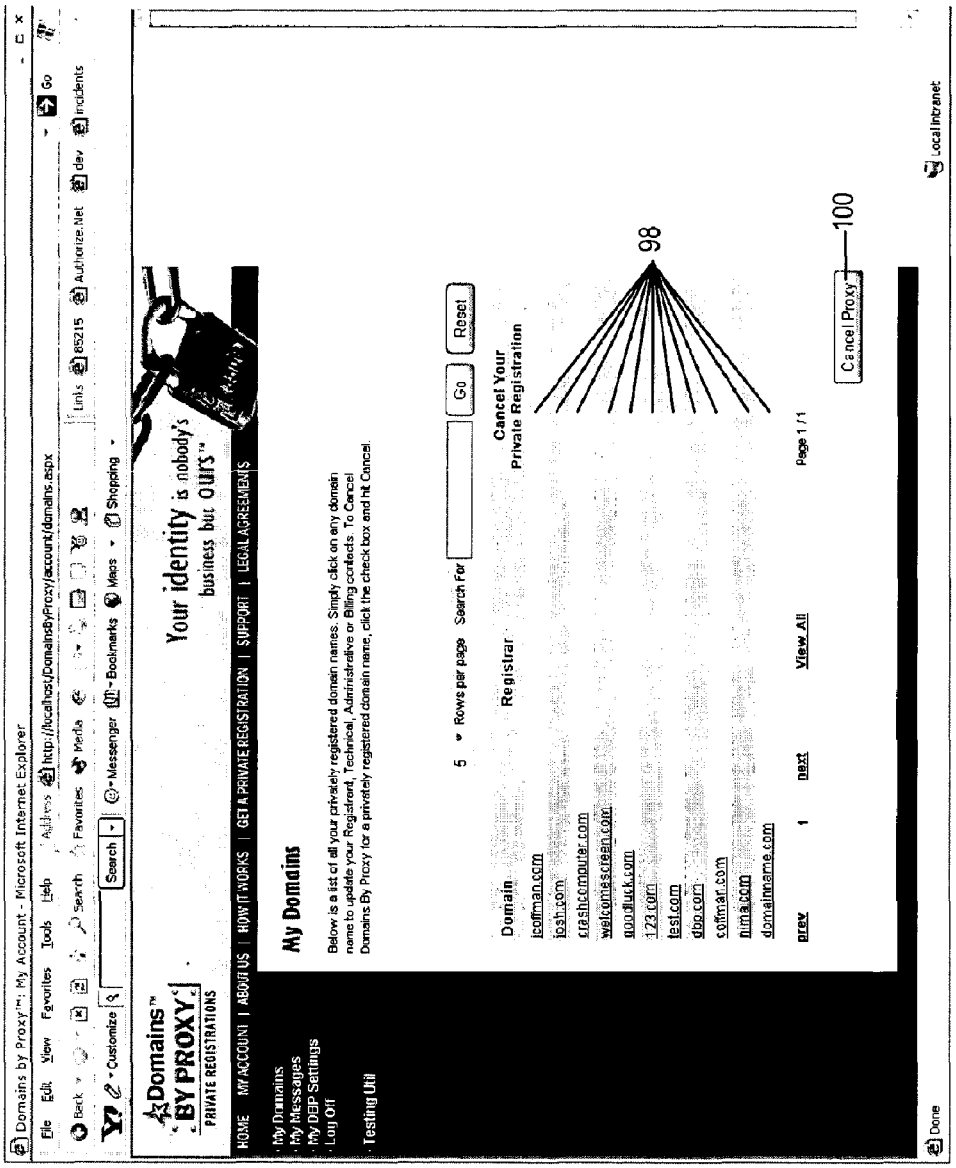
FIG. 14 is a screen shot showing a screen by which the customer can cancel proxy registration.

By a screen shown in FIG. 14, the proxy entity affords the customer the opportunity to cancel proxy registration. The customer checks the relevant domain name by clicking on one or more of the boxes 98 provided and then by clicking on the cancel proxy button 100. As shown in FIG. 5*a*, at 102, by clicking on the cancel proxy button the customer sends the cancel order to the proxy at 104. The proxy retrieves the relevant customer contact information at 106. At 108 the proxy requests transfer of the registration by the registrar, which receives that request at 110. At 112, the registrar pulls the proxy contact information. The registrar then sends the request for transfer along with both the proxy contact information and the customer contact information at 114 to the registry at 116. The registry effects transfer as shown at 118, FIG. 5b. The registry updates its portion 23 of the WHOIS database and at 120 sends a confirmation to the registrar which is received at 122. The registrar updates its portion 25 of the WHOIS database and then sends confirmation at 124 to the customer, who receives it at 126.

Figure 7:
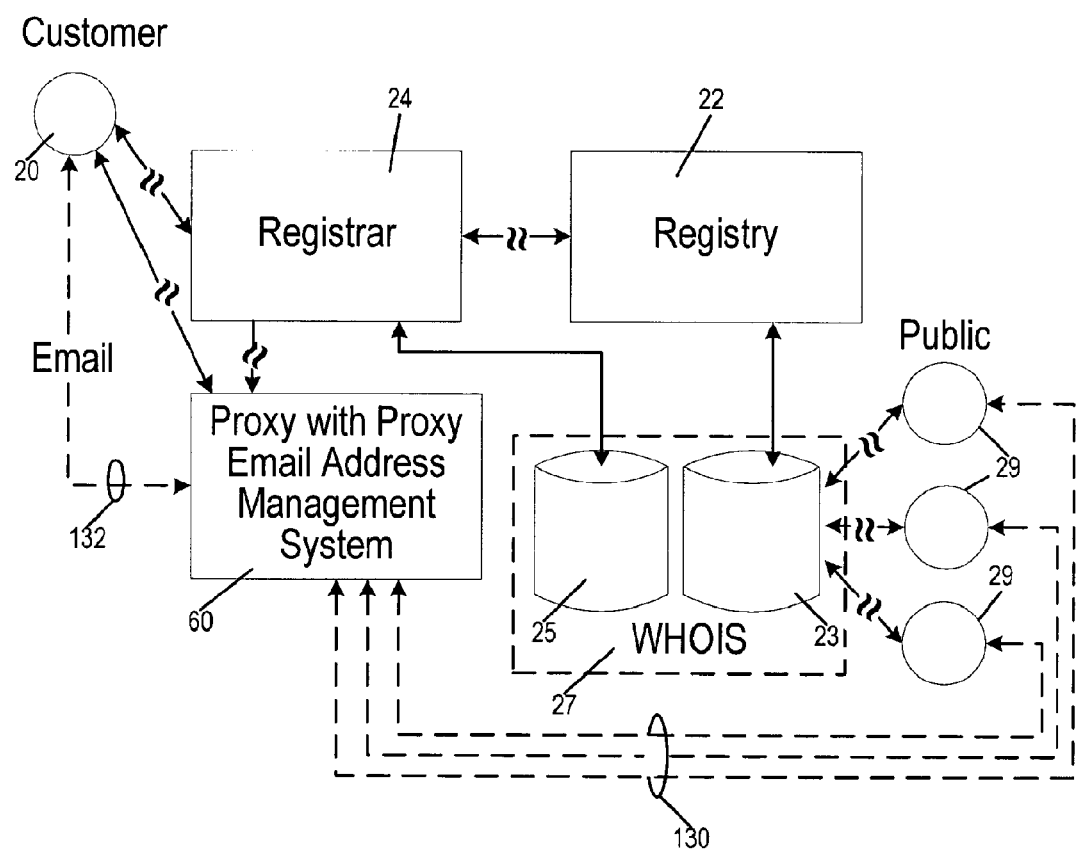
FIG. 7 is a block diagram like FIG. 6 showing the participants in a proxy email process according to this invention.

FIG. 7 shows the relationship of the participants in a proxy email address management system. As previously, the proxy 60 is the proxy domain name registrant. Email senders 29 who learn of the proxy registrant's email address from WHOIS 27, or from another source, send their email to the proxy email address as indicated at 130. The proxy 60 forwards such email as the customer has indicated he or she is interested in receiving. This is indicated at 132.

Figure 12:
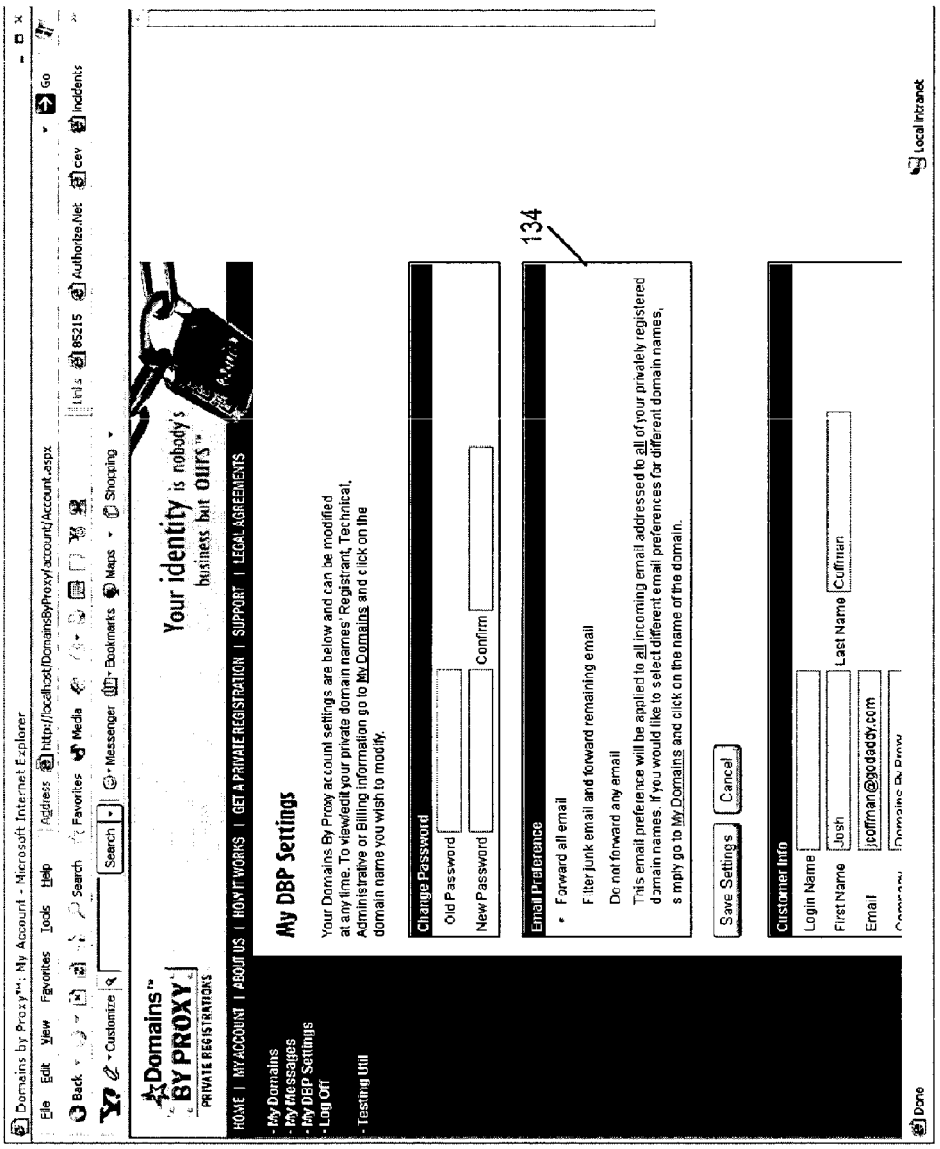
FIG. 12 is a screen shot and illustrates a screen by which a customer can set his choices for email and input his contact's identification.

As shown in the screen shot of FIG. 12, the customer 29 was given a number of filtration choices at 134. The customer can elect to have all email forwarded by the proxy 60, to filter called "junk email" or not to have mail sent to the proxy email address forwarded.

Returning to FIG. 7 in one embodiment, the customer 20 who desires to send email of his or her own addresses the mail to the proxy who then forwards the mail under its own proxy email address. In this embodiment, the customer's email address is not revealed. Alternatively, the proxy only forwards email to the customer. The customer then, if he or she so desires, responds to those emails of interest under its own email address.

Figure 8A:
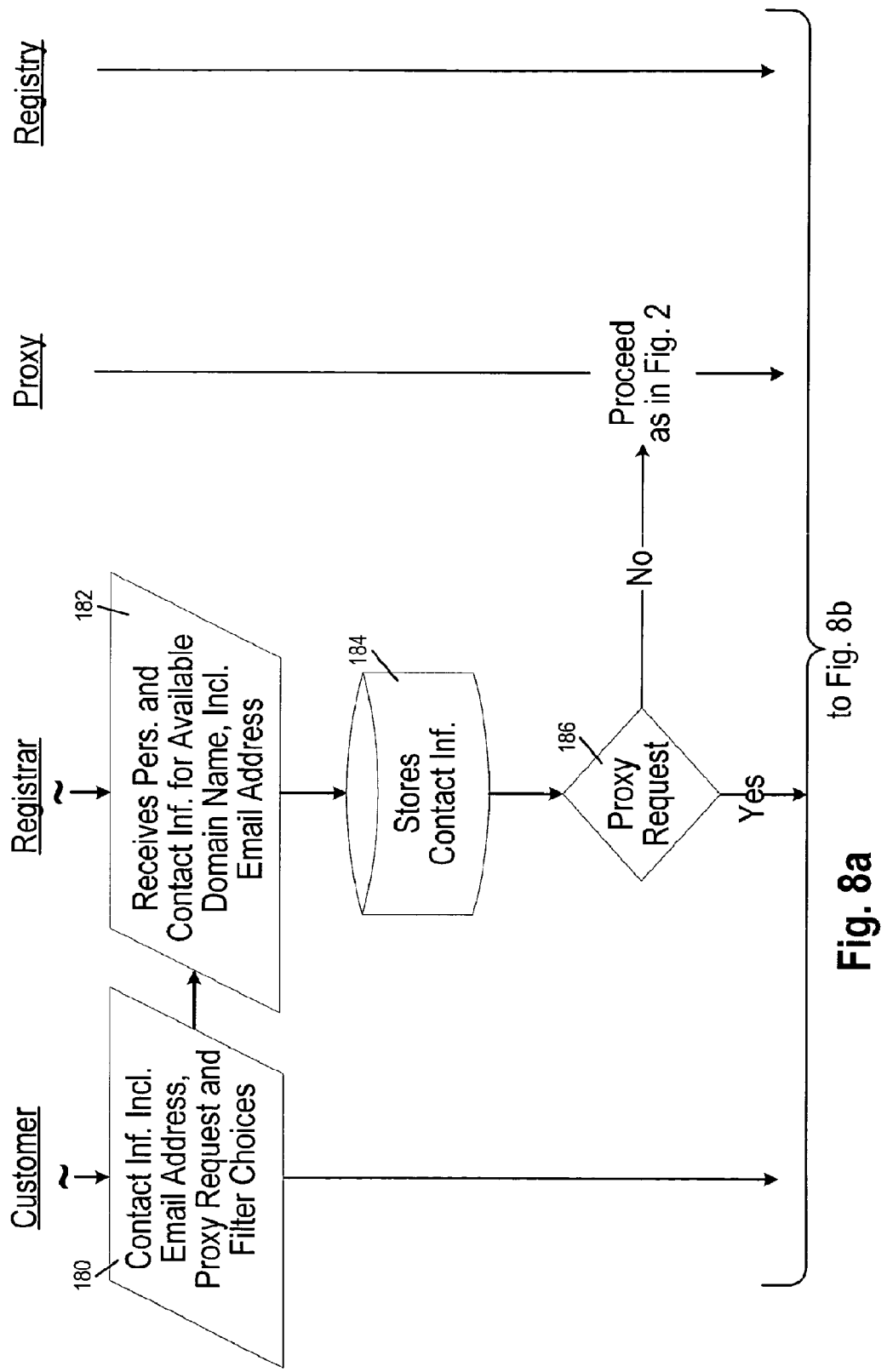
FIG. 8 is a functional block diagram in flowchart form illustrating a portion of the proxy registration process by which proxy email is affected.
Figure 8B:
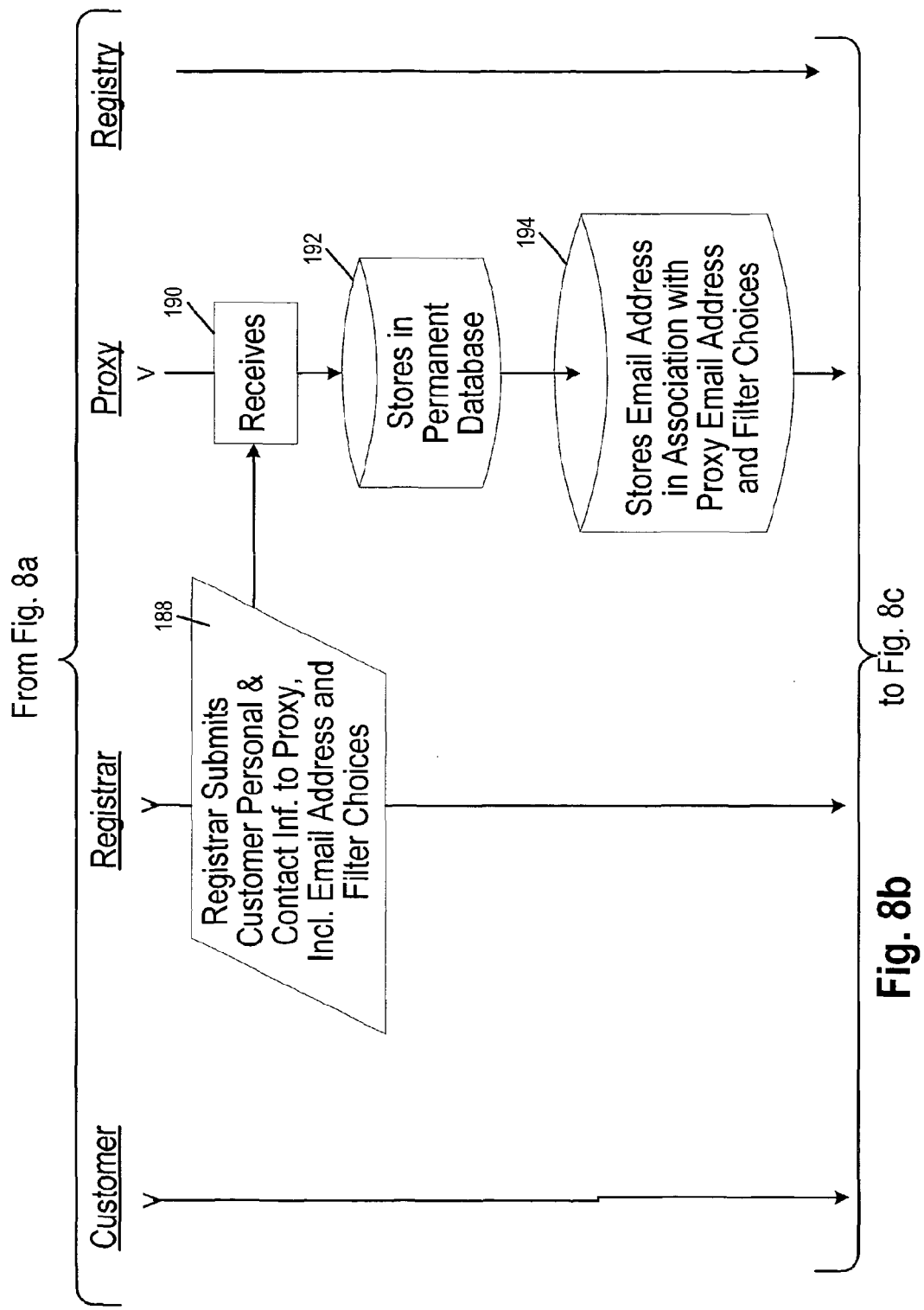
Figure 8C:
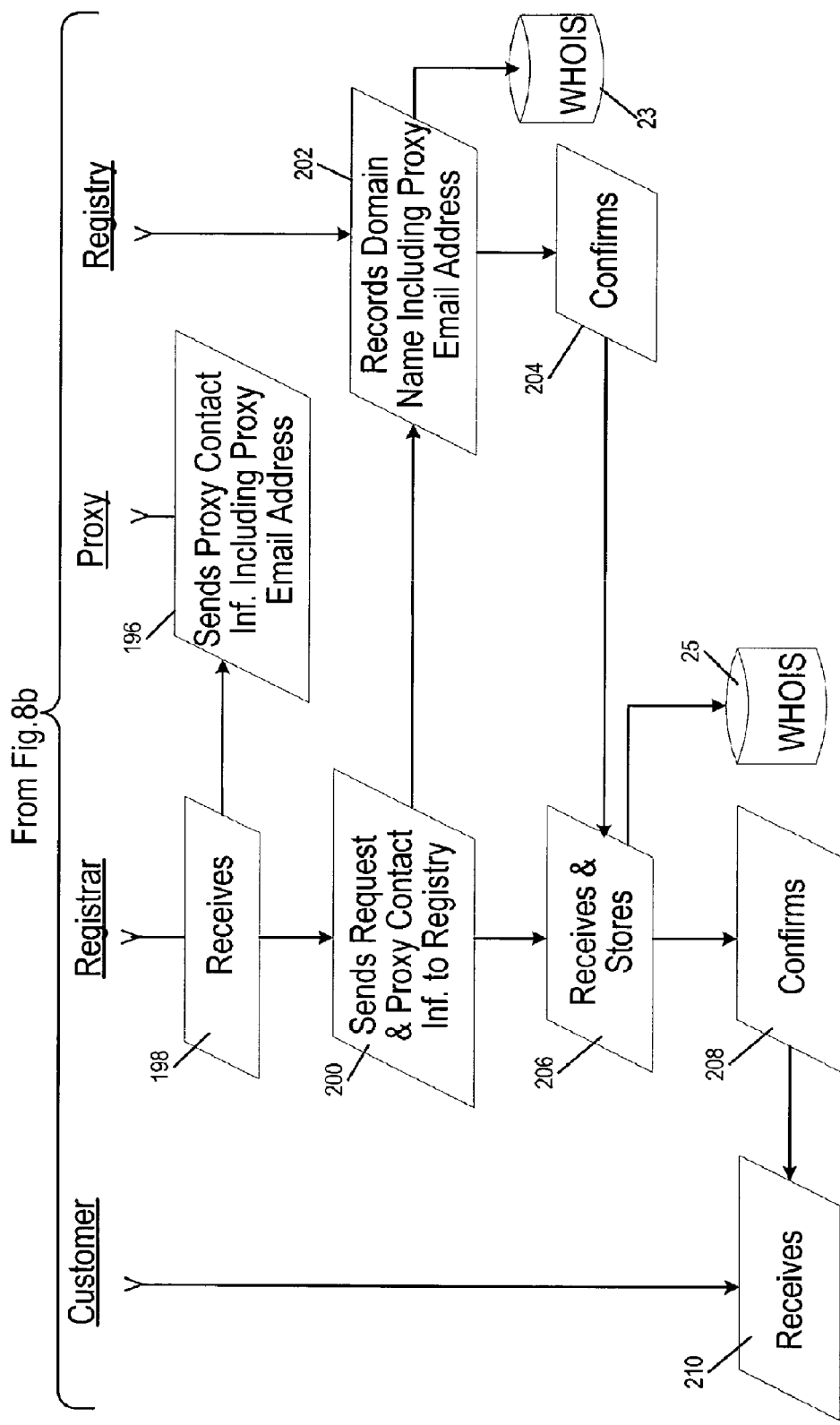

FIG. 8 shows the process by which proxy email is established. After it has been determined that the domain name is available as previously described, the customer 20 is prompted for his or her contact information including email address. the customer is also prompted to indicate proxy domain name registration is desired and whether proxy email is desired. If so, the customer's filter choices are to be indicated as indicated at the location 134 on the screen of FIG. 12. The customer responds at 180. The registrar receives the contact information including the email address at 182. It stores these at 184. At the decision block 186, it is determined whether a proxy request has been made. If not, the program proceeds as in FIG. 2. If yes is the answer, the registrar submits customer personal information to the proxy including the email address and filter choices at 188 in FIG. 8b. The proxy receives the information at 190 and stores it in its permanent database at 192. At 194 the proxy also stores the email address in association with the proxy email address and filter choices. At proxy 60 of FIG. 7, for each customer that requests to be registered for proxy email, the email address management system creates a virtual email address according to naming conventions and associates it with that customer's account. At 196 in FIG. 8c the proxy sends proxy information including the virtual email address to the registrar, which the registrar receives at 198. The registrar sends the request for domain name registration with the identification of the proxy as the registrant and the registrar information to the registry at 200. The registry records this information in its portion 23 of WHOIS at 202. The registry confirms registration at 204. The registrar receives that confirmation at 206. At 208 the registrar stores the proxy contact information in its permanent table along with the email address of the proxy and this appears in the WHOIS record 25 administered by the registrar. The registrar then confirms the registration to the customer who receives it at 208. The customer receives the confirmation at 210. The customer is now set up to receive email filtered as desired.

The proxy email address management system of the proxy uses the following standards. For the domain name "DomainA.com" the virtual email address dbp.DomainA.com@DomainsByProxy.com is assigned. Thus, the virtual email address is unique to each domain and conflict with a real email address on DomainsByProxy.com, the domain name of the proxy, is improbable.

Figure 9:
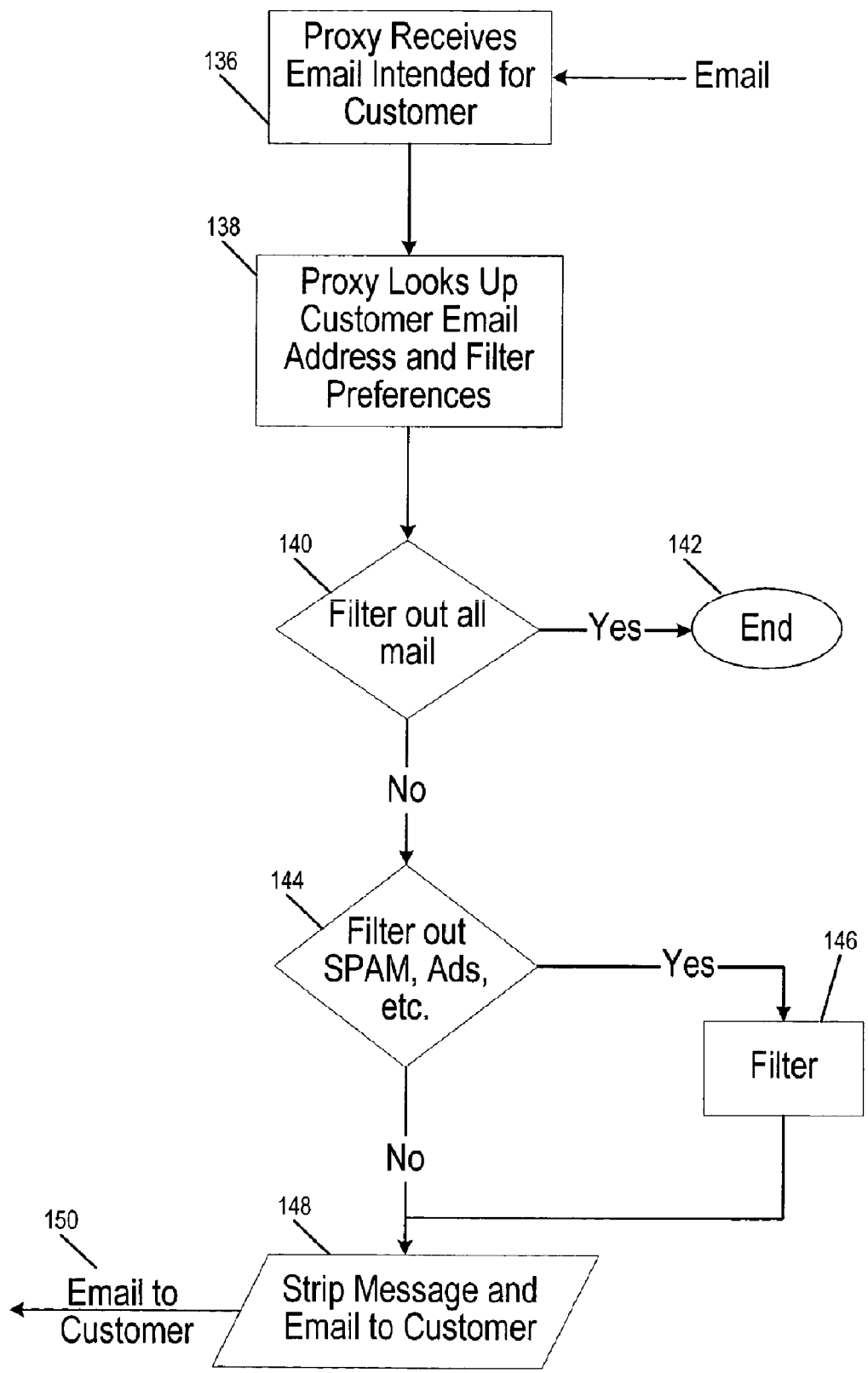
FIG. 9 is a functional block diagram in flowchart form illustrating the proxy email process.

At the proxy installation an email server is set up to accept emails for the proxy's email address domain. The processing of email by the proxy is shown in FIG. 9. At 136, the proxy computer installation receives email from a sender such as one of the individuals 29 in FIG. 7. At 138, the proxy sender determines it's an email intended for a customer and looks up the customer email addresses and filter preferences. The email server is configured to send all of the incoming proxy email messages to a common "catch-all" account. Email messages for the email server are stored according to RFC821 (SMTP) requirements. The email address management system periodically checks each account for new email messages via the known POP protocol. This polling model was chosen to separate the email address management system from the email server. Thereby, the email server does not need to have intrinsic knowledge of the management system. The management system is therefore capable of using any email server that supports the POP protocol.

When new email is found, the system iterates through each email found on the email server. For each message, it checks the "To:" addresses and the "Cc:" addresses for virtual email addresses being served by the proxy. If it finds one, it retrieves the real email address for that customer and that customer's email forwarding preference. At 140 it is determined whether the customer has chosen to filter out all email. If that is the case, the program is ended at 132. If the answer is no, then it is determined whether the customer has sought to filter out junk email, e.g., SPAM, bulk advertisements, etc. If the answer at the decision block 144 is yes, then the proxy uses known programs to determine, based on key words in the message, whether the message is likely to be SPAM, pornography, or other objectionable content. The number of recipients is checked in the "To:" or "Cc:" fields to determine if this is likely bulk solicitations or mailings and these are filtered out. Email from known purveyors of SPAM, bulk mailings and ads can be filtered out. Once filtration is done, the remaining emails are, at 148, stripped of their message, copied into an email from the proxy to the customer. It is sent to the customer along with the sender's email address and a message that the email was received by the proxy. The email is then forwarded to the customer at 150. Once every email address for that message has been checked for proxy users, it is deleted from the host email server.

Figure 13:
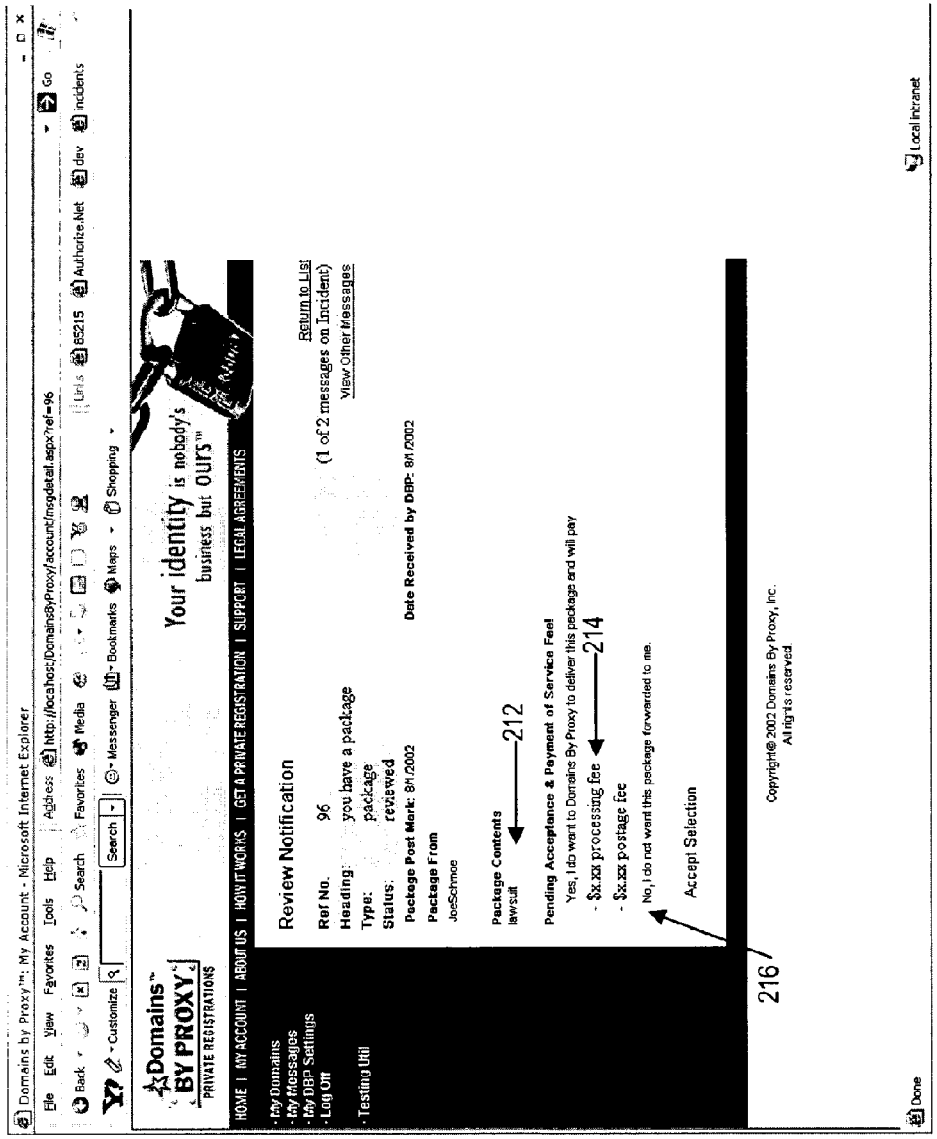
FIG. 13 is a screen shot of a screen by which a customer can accept mail delivery of mail to the proxy address appearing on the WHOIS record.
Figure 15:
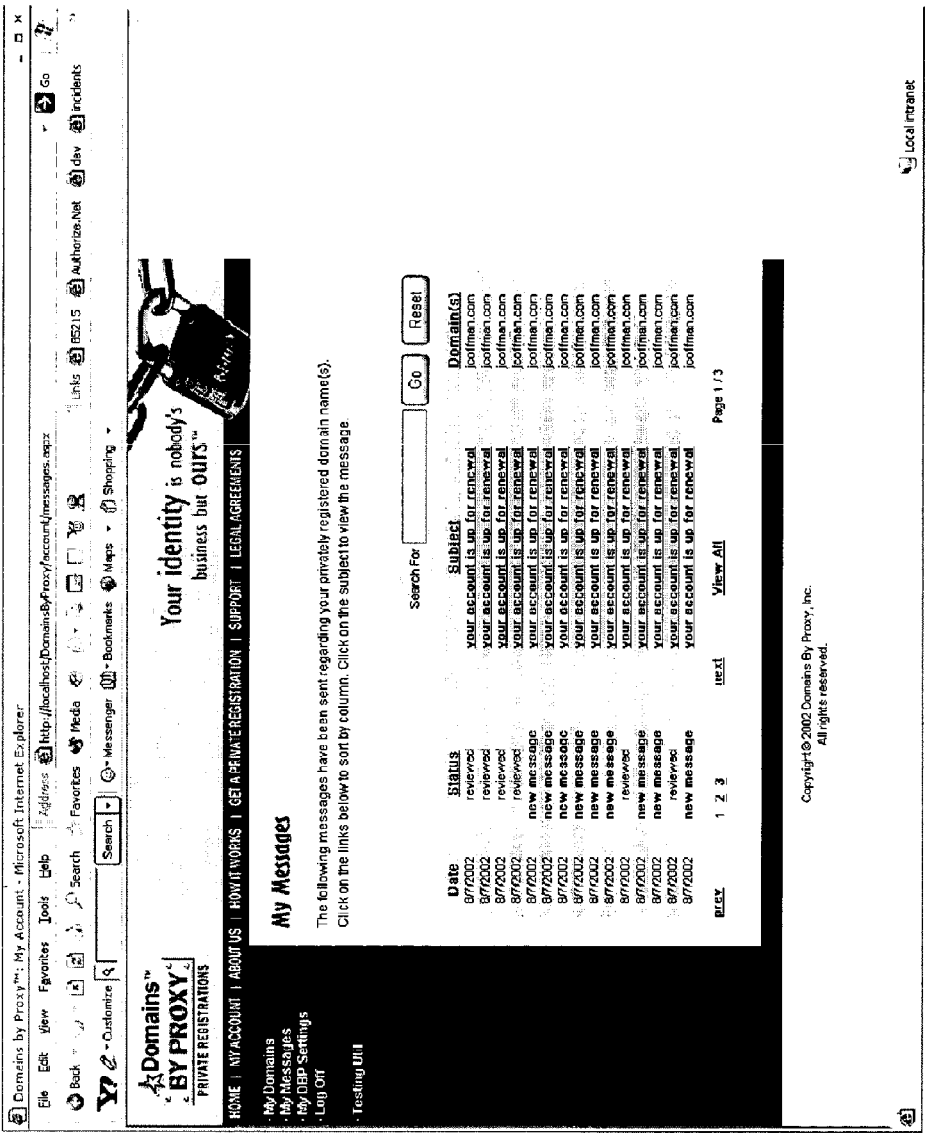
FIG. 15 is a screen shot showing a screen by which a customer can access messages from the proxy.

As shown in FIG. 15, in addition to email, the customer can receive messages directly from the proxy 60. These are typically messages bearing on the status of the account and also messages that can indicate the receipt of surface mail. Remembering that the contact information in WHOIS includes the proxy's address, persons desirous of sending surface mail will from time to time address that surface mail to the mailing address in the contact information. FIG. 13 is a screen shot illustrating the proxy's communication of, in this case, the receipt of a complaint instituting a suit against the customer. This is shown at the field 212. At 214 the customer is given the opportunity to say that he or she does wish to receive this mail, or at 216 the customer is given an opportunity to decline receiving the mail.

The foregoing descriptions of at least one preferred embodiment are exemplary and not intended to limit the claimed invention. Obvious modifications that do not depart The inventions claimed are:

1. A system, comprising:
   (a) a registrar installation comprising:
      (i) means for receiving at least one customer domain name registration request from at least one customer,
      (ii) means for communicating at least one registrar domain name registration request to a registry, the at least one registrar domain name registration request comprising at least one domain name and at least one domain name registrant contact information,
      (iii) means for communicating the at least one domain name and at least one customer information regarding the at least one customer to a proxy installation, and
      (iv) means for storing the at least one domain name registrant contact information,
   (b) the proxy installation comprising:
      (i) means for receiving and storing the at least one customer information communicated to the proxy installation by the registrar installation, and
      (ii) means for communicating at least one proxy information to the registrar installation,
   (c) the registrar installation being responsive to receipt of the at least one proxy information by:
      (i) submitting the at least one registrar domain name registration request to the registry, wherein the at least one domain name registrant contact information comprises the at least one proxy information, and
      (ii) storing the at least one proxy information in the means for storing the at least one domain name registrant contact information.

2. The system according to claim 1, wherein the proxy installation further comprises means enabling the at least one customer to signal a command to cancel a proxy registration.

3. The system according to claim 2, wherein the means enabling the at least one customer to signal the command to cancel comprises means responsive to the at least one customer's signal of the command to cancel for automatically causing the registrar installation to transfer registration of the at least one domain name to the at least one customer.

4. The system according to claim 1, wherein the proxy installation comprises means for passing at least one email along to the at least one customer.

5. The system according to claim 4, further comprising means for blocking one or more categories of email from reaching the at least one customer.

6. The system according to claim 5, wherein the categories of email comprise at least one of SPAM, unauthorized bulk email, unauthorized commercial email, or pornography.

7. The system according to claim 1, wherein the means for receiving the at least one customer domain name registration request from the at least one customer comprises means for receiving the at least one customer domain name registration request from the at least one customer comprising at least one of an individual, a business, or an other entity, and the means for communicating the at least one domain name and the at least one customer information regarding the at least one customer to the proxy installation comprises means for communicating the at least one customer information regarding the at least one customer comprising the at least one of the individual, the business, or the other entity.

8. The system according to claim 1, wherein the at least one customer comprises an individual.

9. The system according to claim 1, wherein the at least one customer comprises an entity.

10. A system comprising:
    (a) a registrar computer installation establishing a registrar web site;
    (b) a proxy computer installation;
    (c) at least one interactive registrar page on the registrar web site enabling a customer to request a registration of at least one domain name;
    (d) a message on at least one of the at least one interactive registrar page prompting the customer to indicate whether a proxy registration of the at least one domain name is desired;
    (e) a field on at least one of the at least one interactive registrar page for the customer to enter the at least one domain name;
    (f) a connection at the registrar computer installation for communicating to the proxy computer installation:
       (i) a request for at least one proxy information for use in registering the at least one domain name to a proxy having a name, and
       (ii) at least one customer information of the customer;
    (g) the proxy computer installation comprising a first database for storing in association the at least one domain name and the at least one customer information;
    (h) a connection at the proxy computer installation for communicating the at least one proxy information to the registrar computer installation;
    (i) the registrar computer installation comprising a second database for storing in association the at least one proxy information and the at least one domain name; and
    (j) a connection at the registrar computer installation for sending to a domain name registry:
       (i) a request for the proxy registration of the at least one domain name in the name of the proxy; and
       (ii) the at least one proxy information.

11. The system according to claim 10, further comprising a communication input at the proxy computer installation for receipt of communications for the customer.

12. The system according to claim 11, wherein the communication input at the proxy computer installation comprises a proxy web site having at least one interactive proxy page enabling the customer to indicate cancellation of the proxy registration of the at least one domain name.

13. The system according to claim 12, wherein the proxy computer installation is adapted to communicate a request for cancellation of the proxy registration of the at least one domain name to the registrar computer installation when cancellation of the proxy registration of the at least one domain name is requested by the customer, and to forward to the registrar computer installation the at least one domain name and the at least one customer information of the customer, the registrar computer installation being responsive to the request for cancellation of the proxy registration from the proxy computer installation to contact the domain name registry and effect a transfer of the registration of the at least one domain name from the proxy to the customer and to supply the at least one customer information to the domain name registry and replace in the second database of the registrar computer installation the at least one proxy information with the at least one customer information.

14. The system according to claim 10, further comprising a proxy email server adapted to receive at least one email, the at least one proxy information comprising a proxy email address, the registrar computer installation publishing the proxy email address in association with the at least one domain name, whereby an email intended for the customer is directed to the proxy email server.

15. The system according to claim 10, wherein at least one of the at least one interactive registrar page enables a request for registration by the customer comprising at least one of an individual, a business, or an other entity, and the connection at the registrar computer installation for communicating to the proxy computer installation communicates the at least one customer information of the customer comprising the at least one of the individual, the business, or the other entity.

16. The system according to claim 10, wherein the customer comprises an individual.

17. The system according to claim 10, wherein the customer comprises an entity.

18. A method comprising:
(a) providing a computer installation accessible via a computer network,
(b) receiving, at the computer installation from at least one customer via the computer network, at least one request to register at least one domain name,
(c) offering the at least one customer at least one proxy registration of the at least one domain name,
(d) receiving at least one proxy registration request for the at least one domain name from the at least one customer,
(e) forwarding the at least one domain name and at least one customer information regarding the at least one customer to a proxy,
(f) receiving at least one proxy information from the proxy, and
(g) registering by proxy the at least one domain name with a registry, wherein registering comprises providing the at least one proxy information to the registry for the at least one domain name registered by the at least one proxy registration.

19. The method according to claim 18, further comprising: requesting the at least one customer information from the at least one customer requesting the at least one proxy registration, and transferring to the proxy for storage by the proxy the at least one customer information in association with the at least one domain name registered by the at least one proxy registration.

20. The method according to claim 19, further comprising: storing the at least one proxy information in association with the at least one domain name registered by the at least one proxy registration.

21. The method according to claim 20, further comprising: directing to the proxy electronic communications addressed to the at least one domain name registered by the at least one proxy registration.

22. The method according to claim 18, further comprising providing a cancellation procedure to the at least one customer.

23. The method according to claim 22, in response to receiving a request from the at least one customer to use the cancellation procedure, transferring registration of the at least one domain name registered by the at least one proxy registration to the at least one customer.

24. The method according to claim 22 further comprising: retrieving the at least one customer information from the proxy, and transferring the at least one customer information to the registry at which the at least one domain name is registered.

25. The method according to claim 18, wherein the at least one customer of steps (b), (c) and (e) comprises at least one of an individual, a business, or an other entity.

26. The method according to claim 18, wherein the at least one customer comprises an individual.

27. The method according to claim 18, wherein the at least one customer comprises an entity.

28. The method according to claim 18, wherein the computer network comprises the Internet.

29. The method according to claim 18, wherein steps (f) and (g) are performed during the same communication session between the computer installation and the at least one customer.

30. A computer program comprising a non-transitory computer readable medium storing computer readable code executable by a computer and comprising:
(a) a first program for defining a web site comprising a first programming for:
(i) receiving from a customer at the web site a customer request to register at least one domain name,
(ii) offering to the customer at the web site an option to register the at least one domain name by proxy, and
(iii) receiving at least one customer information regarding the customer,
(b) a second program for communicating with a registry comprising a second programming for:
(i) communicating the at least one domain name, a registrar request to register the at least one domain name, and at least one registrant information to the registry, and
(c) a third program for communicating with a proxy comprising a third programming for:
(i) requesting at least one proxy information for use in association with the at least one registrant information.

31. The computer program of claim 30, wherein the second program for communicating with the registry comprises an additional programming for forwarding the at least one registrant information in association with the at least one proxy information to the registry with the at least one domain name to be registered by proxy.

32. The computer program of claim 31, further comprising a further programming to store the at least one proxy information in association with the at least one domain name.

33. The computer program of claim 32, wherein the at least one proxy information forwarded to the registry comprises an identity of the proxy.

34. The computer program of claim 33, wherein the at least one proxy information that is stored comprises at least one contact information for the proxy.

35. The computer program of claim 34, wherein the at least one contact information for the proxy comprises an email address for the proxy.

36. The computer program of claim 30, wherein the third program for communicating with the proxy comprises an additional programming for forwarding the at least one customer information to the proxy.

37. The computer program of claim 36, wherein the at least one customer information comprises contact information for the customer.

38. The program computer program of claim 37, wherein the contact information of the at least one customer information comprises an email address for the customer.

39. The computer program according to claim 30, wherein the web site receives the customer request and the at least one customer information from the customer that comprises an individual, a business, or an other entity.

40. The computer program according to claim 30, wherein the customer comprises an individual.

41. The computer program according to claim 30, wherein the customer comprises an entity.

42. Programming comprising a non-transitory computer readable medium storing computer readable code executable by a computer and comprising:

(a) communications programming enabling the computer to receive:
  (i) a domain name;
  (ii) a request for at least one proxy domain name registrant information for the domain name, the at least one proxy domain name registrant information being for a proxy entity having a name; and
  (iii) at least one customer information for a customer that has requested a proxy domain name registration of the domain name;
(b) a database;
(c) programming to store in the database the at least one customer information in association with the domain name;
(d) programming to retrieve the domain name and the at least one customer information; and
(e) further communications programming enabling the computer to send to a registrar the at least one proxy domain name registrant information to be used in registering the domain name in the name of the proxy entity.

43. The programming according to claim 42 further comprising:
  web site programming to establish an interactive web site for communication with the proxy entity.

44. The programming according to claim 43, wherein the web site programming comprises a web page for receiving a request for cancellation of the proxy domain name registration.

45. The programming according to claim 44, further comprising programming responsive to the request for cancellation of the proxy domain name registration to cause retrieval of the at least one customer information associated with the proxy domain name registration to be cancelled, and subsequently, to cause additional communications programming to send to the registrar the at least one customer information that is retrieved.

46. A system comprising:
(a) a computer installation establishing a web site;
(b) at least one interactive page on the web site enabling a customer to request a registration of at least one domain name;
(c) a field on at least one of the at least one interactive page for the customer to enter the at least one domain name;
(d) a message on at least one of the at least one interactive page prompting the customer to indicate whether a proxy registration of the at least one domain name is desired;
(e) a computer installation programming operative in response to the customer's indication of a desire for the proxy registration of the at least one domain name to associate at least one proxy information regarding a proxy domain name registrant with the at least one domain name, the proxy domain name registrant having a name;
(f) a database for storing in association with at least one customer information of the customer the at least one domain name and the at least one proxy information, and
(g) a connection at the computer installation for sending to a domain name registry:
  (i) a request for registration of the at least one domain name in the name of the proxy domain name registrant; and
  (ii) at least a portion of the at least one proxy information.

47. The system according to claim 46, further comprising a communication input for receipt of electronic communications for the customer.

* * * * *